US012614126B2

(12) United States Patent
Urano

(10) Patent No.: US 12,614,126 B2
(45) Date of Patent: Apr. 28, 2026

(54) METHOD AND APPARATUS FOR MANAGING OPERATION OF TRANSPORTATION SERVICE VEHICLE, AND NON-TRANSITORY COMPUTER-READABLE STORAGE MEDIUM

(71) Applicant: TOYOTA JIDOSHA KABUSHIKI KAISHA, Toyota (JP)

(72) Inventor: Hiromitsu Urano, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 481 days.

(21) Appl. No.: 18/339,331

(22) Filed: Jun. 22, 2023

(65) Prior Publication Data

US 2023/0419193 A1      Dec. 28, 2023

(30) Foreign Application Priority Data

Jun. 24, 2022     (JP) ................................. 2022-102169

(51) Int. Cl.
| | |
|---|---|
| *G06Q 10/02* | (2012.01) |
| *B60W 60/00* | (2020.01) |
| *G06Q 50/40* | (2024.01) |

(52) U.S. Cl.
CPC ......... *G06Q 10/02* (2013.01); *B60W 60/0025* (2020.02); *G06Q 50/40* (2024.01)

(58) Field of Classification Search
CPC .... G06Q 10/02; G06Q 50/40; B60W 60/0025
See application file for complete search history.

(56) References Cited

U.S. PATENT DOCUMENTS

| | | |
|---|---|---|
| 2020/0191584 A1 | 6/2020 | Kamata |
| 2020/0193835 A1 | 6/2020 | Kamata et al. |
| | (Continued) | |

FOREIGN PATENT DOCUMENTS

| | | |
|---|---|---|
| JP | H0916898 A | 1/1997 |
| JP | 2006350842 A | 12/2006 |
| | (Continued) | |

OTHER PUBLICATIONS

Vevs Car, https://web.archive.org/web/20230630111852/https://www.vevs.com/car-rental-software/ (Year: 2023).*

(Continued)

*Primary Examiner* — Aryan E Weisenfeld
(74) *Attorney, Agent, or Firm* — Dinsmore & Shohl LLP

(57) ABSTRACT

According to the method of the present disclosure, first, an application for a reservation for at least one of a point and a time at which a first transportation service vehicle is to be stopped is received from a user. Next, an overlap is detected between the reservation and an operation schedule related to a stopping point and a stopping time of each of other transportation service vehicles operated in a region where the first transportation service vehicle is operated. Further, a priority between the first transportation service vehicle and a second transportation service vehicle having an operation schedule overlapping with the reservation among the other transportation service vehicles is determined based on at least a service type of each of the first transportation service vehicle and the second transportation service vehicle. Then, the user is notified of approval or disapproval of the reservation determined based on the priority.

17 Claims, 12 Drawing Sheets

(56)     References Cited

U.S. PATENT DOCUMENTS

| | | |
|---|---|---|
| 2020/0356906 A1 | 11/2020 | Yoshinaga |
| 2022/0189304 A1 | 6/2022 | Fujita |

FOREIGN PATENT DOCUMENTS

| | | |
|---|---|---|
| JP | 2020095460 A | 6/2020 |
| JP | 2020095478 A | 6/2020 |
| JP | 2020166755 A | 10/2020 |
| JP | 2020184220 A | 11/2020 |
| JP | 2020187520 A | 11/2020 |

OTHER PUBLICATIONS

Zaui, https://web.archive.org/web/20230323231256/https://www.zaui.com/industries/transportation/ (Year: 2023).*

* cited by examiner

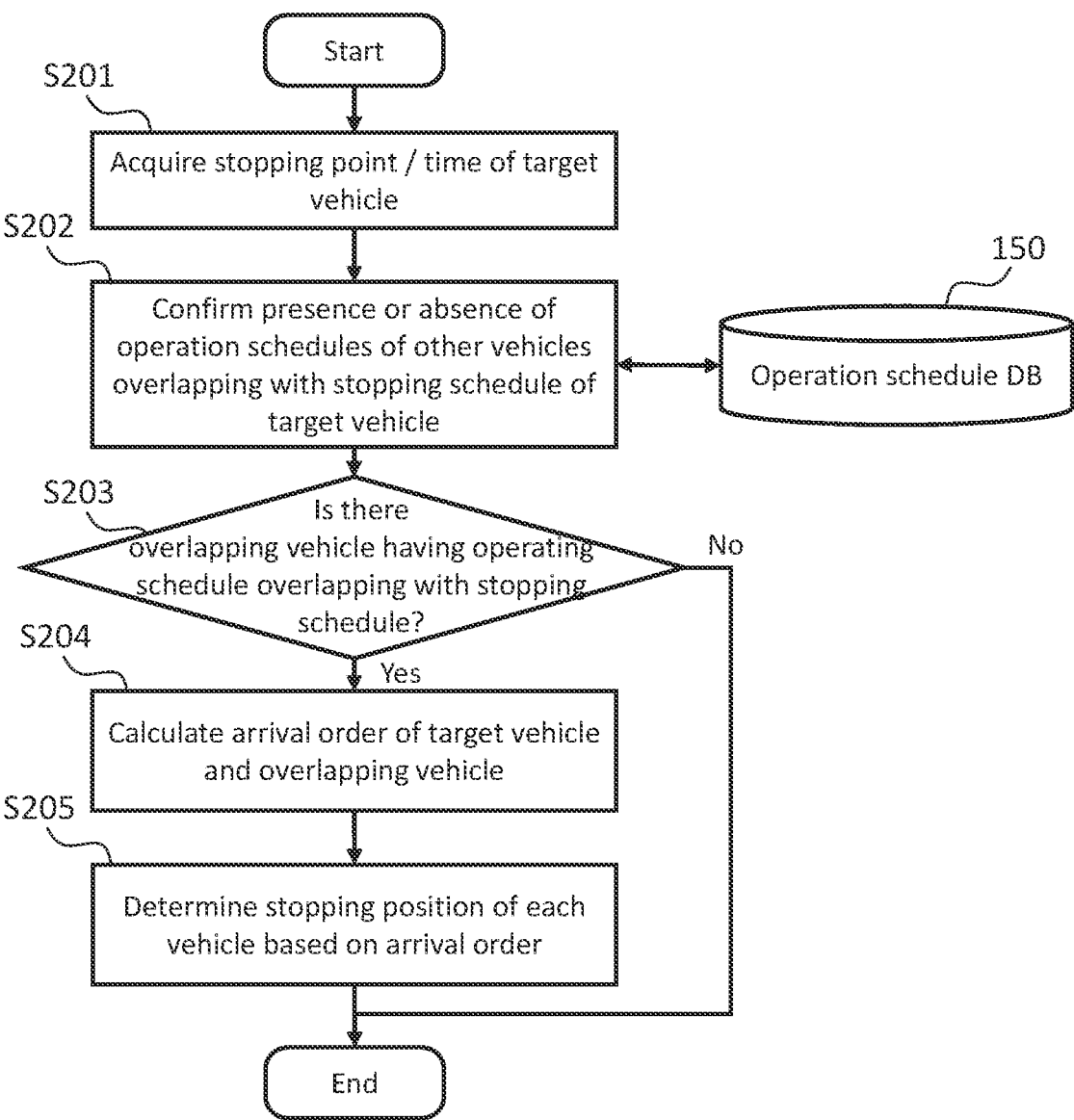

S201

S202

S203

S204

S205

150

Start

Acquire stopping point / time of target vehicle

Confirm presence or absence of operation schedules of other vehicles overlapping with stopping schedule of target vehicle Operation schedule DB Is there overlapping vehicle having operating schedule overlapping with stopping schedule?

No

Yes

Calculate arrival order of target vehicle and overlapping vehicle

Determine stopping position of each vehicle based on arrival order

End

Fig. 10

METHOD AND APPARATUS FOR MANAGING OPERATION OF TRANSPORTATION SERVICE VEHICLE, AND NON-TRANSITORY COMPUTER-READABLE STORAGE MEDIUM

CROSS-REFERENCE TO RELATED APPLICATION

The present application claims priority under 35 U.S.C. § 119 to Japanese Patent Application No. 2022-102169, filed Jun. 24, 2022, the contents of which application are incorporated herein by reference in their entirety.

BACKGROUND

Field

The present disclosure relates to a method and an apparatus for managing operation of a transportation service vehicle driven automatically, and a non-transitory computer-readable storage medium storing a program for managing the operation of the transportation service vehicle driven automatically.

Background Art

JP2020-095460A discloses a technique related to traffic management of a plurality of vehicles driven automatically. When the plurality of vehicles has the same destination, the plurality of vehicles may arrive at the destination in the same time period. In the prior art disclosed in JP2020-095460A, a priority for a desired stopping position is determined among vehicles arriving at the destination in the same time period on the basis of information on an occupant in each vehicle. For example, when the destination is a station, the desired stopping position is set to a certain area of a rotary in front of the station. As the information of the occupant, information relating to the age of the occupant, the presence or absence of pregnancy, whether or not the occupant is accompanied by an infant, the presence or absence of a handicap and its grade, and the presence or absence of a disease and its severity is adopted.

In addition to JP2020-095460A, JP2020-187520A, JP2006-350842A, JP2020-166755A, and JP09-016898A can be exemplified as documents showing the technical level of the technical field related to the present disclosure.

SUMMARY

In the prior art described above, the stopping position of the vehicle is determined in accordance with the priority. However, when stopping on a road, it is good if there is a stoppable area such as an area in the rotary in front of the station, but some vehicles may not be able to stop due to restrictions on stopping points. Further, even in the rotary in front of the station, when the stoppable area is full, following vehicles will not be able to stop and will be stranded. In addition, in order to smoothly provide a transportation service, a difference in service type provided by each transportation service vehicle should be taken into consideration.

The present disclosure has been made in view of the above-described problems. An object of the present disclosure is to provide a technique capable of achieving smooth provision of a transportation service while suppressing confusion at a stopping point in a case where stopping points and stopping times overlap between a plurality of transportation service vehicles driven automatically.

The present disclosure provides a method for managing operation of a transportation service vehicle driven automatically.

The method of the present disclosure comprises the following steps. The first step is a step of receiving from a user an application for a reservation for at least one of a point and a time at which a first transportation service vehicle is to be stopped. The second step is a step of detecting an overlap between the reservation for the first transportation service vehicle and an operation schedule related to a stopping point and a stopping time each of other transportation service vehicles operated in a region where the first transportation service vehicle is operated. The third step is a step of determining a priority between the first transportation service vehicle and a second transportation service vehicle having an operation schedule overlapping with the reservation for the first transportation service vehicle among the other transportation service vehicles. In the method of the present disclosure, the priority is determined based on at least a service type of each of the first transportation service vehicle and the second transportation service vehicle. The fourth step is a step of notifying the user of approval or disapproval of the reservation for the first transportation service vehicle determined based on the priority.

When a plurality of transportation service vehicles is concentrated at one stopping point in the same time period, confusion occurs at the stopping point. However, according to the method of the present disclosure, at the stage where the user makes a reservation for one transportation service vehicle, it is determined whether or not there is an overlap in a stopping point and a stopping time with another transportation service vehicle. This makes it possible to prevent confusion from occurring at the stopping point in advance. Whether or not the reservation from the user is approved depends on the priority of the transportation service vehicle for which the reservation is applied by the user. The priority is determined based on the service type of each transportation service vehicle. There are various service types in the transportation service provided by using the transportation service vehicle, and influence on the entire transportation service in the region differs depend on the service type. Therefore, by reflecting the difference in the service type in the priority, smooth provision of the transportation service is achieved while suppressing confusion at the stopping point.

In the method of the present disclosure, the determining the priority may comprise determining the priority based on a number of occupants in each of the first transportation service vehicle and the second transportation service vehicle when there is no difference in the service type between each of the first transportation service vehicle and the second transportation service vehicle. When the service type is the same, a transportation service vehicle carrying a large number of occupants has a larger influence on the entire transportation service in the region. Therefore, by reflecting the number of occupants in the priority, it is possible to realize more smooth provision of the transportation service.

The method of the present disclosure may further comprise changing an operation schedule of the second transportation service vehicle according to the priority. By changing the operation schedule of the second transportation service vehicle, the first transportation service vehicle with higher priority can be operated according to the reservation.

The method of the present disclosure may further comprise proposing a change of the point or the time at which the first transportation service vehicle is to be stopped in a case of the disapproval of the reservation for the first transportation service vehicle. In addition, the method of the present disclosure may further comprise proposing a reservable transportation service vehicle in a case of the disapproval of the reservation. By making these proposals, inconvenience for the user can be reduced.

In addition, in the method of the present disclosure, when the overlap between the reservation for the first transportation service vehicle and the operation schedule of the second transportation service vehicle is detected, one of the first transportation service vehicle and the second transportation service vehicle, which is a vehicle arriving earlier, may be stopped at a position offset from an original stopping position to ensure a stopping place of a vehicle arriving later. By offsetting and stopping the vehicle arriving earlier, the stopping place of the vehicle arriving later can be secured, and the overlap can be eliminated.

In the method according to the present disclosure, the stopping the vehicle arriving earlier comprises determining an offset direction of a stopping point of the vehicle arriving earlier such that a vehicle having an earlier departure time among the vehicle arriving earlier and the vehicle arriving later is positioned ahead of a vehicle having a later departure time. In the method of the present disclosure, the stopping the vehicle arriving earlier comprises determining an offset direction of a stopping point of the vehicle arriving earlier such that a vehicle having a shorter stopping time among the vehicle arriving earlier and the vehicle arriving later is positioned ahead of a vehicle having a longer stopping time. By stopping the vehicle arriving earlier in this way, smooth departure of vehicles from the stopping point is achieved.

The present disclosure provides an apparatus for managing operation of a transportation service vehicle driven automatically.

The apparatus of the present disclosure comprises at least one processor and a program memory storing a plurality of executable instructions. The plurality of instructions is configured to cause the at least one processor to perform the following processes. The first process is to receive from a user an application for a reservation for at least one of a point and a time at which a first transportation service vehicle is to be stopped. The second process is to detect an overlap between the reservation for the first transportation service vehicle and an operation schedule related to a stopping point and a stopping time each of other transportation service vehicles operated in a region where the first transportation service vehicle is operated. The third process is to determine a priority between the first transportation service vehicle and a second transportation service vehicle having an operation schedule overlapping with the reservation for the first transportation service vehicle among the other transportation service vehicles. The priority is determined based on at least a service type of each of the first transportation service vehicle and the second transportation service vehicle. The fourth process is to notify the user of approval or disapproval of the reservation for the first transportation service vehicle determined based on the priority.

In the apparatus of the present disclosure, the instructions may be configured to cause the at least one processor to, when the overlap between the reservation for the first transportation service vehicle and the operation schedule of the second transportation service vehicle is detected, stop one of the first transportation service vehicle and the second transportation service vehicle, which is a vehicle arriving earlier, at a position offset from an original stopping position to ensure a stopping place of a vehicle arriving later. By offsetting and stopping the vehicle arriving earlier, the stopping place of the vehicle arriving later can be secured, and the overlap can be eliminated.

The present disclosure provides a program for managing operation of a transportation service vehicle driven automatically. The program may be stored in a non-transitory computer-readable storage medium.

The program according to the present disclosure comprises a plurality of executable instructions configured to cause at least one processor to execute the following processes. The first process is to receive from a user an application for a reservation for at least one of a point and a time at which a first transportation service vehicle is to be stopped. The second process is to detect an overlap between the reservation for the first transportation service vehicle and an operation schedule related to a stopping point and a stopping time each of other transportation service vehicles operated in a region where the first transportation service vehicle is operated. The third process is to determine a priority between the first transportation service vehicle and a second transportation service vehicle having an operation schedule overlapping with the reservation for the first transportation service vehicle among the other transportation service vehicles. The priority is determined based on at least a service type of each of the first transportation service vehicle and the second transportation service vehicle. The fourth process is to notify the user of approval or disapproval of the reservation for the first transportation service vehicle determined based on the priority.

In the program of the present disclosure, the instructions may be configured to cause the at least one processor to, when the overlap between the reservation for the first transportation service vehicle and the operation schedule of the second transportation service vehicle is detected, stop one of the first transportation service vehicle and the second transportation service vehicle, which is a vehicle arriving earlier, at a position offset from an original stopping position to ensure a stopping place of a vehicle arriving later. By offsetting and stopping the vehicle arriving earlier, the stopping place of the vehicle arriving later can be secured, and the overlap can be eliminated.

As described above, according to the method, the apparatus, and the program of the present disclosure, it is possible to achieve smooth provision of a traffic service while suppressing confusion at a stopping point in a case where stopping points and stopping times overlap between a plurality of transportation service vehicles driven automatically.

BRIEF DESCRIPTION OF THE DRAWINGS

FIG. 10 is a flowchart illustrating an example of processing executed by the stopping position decision apparatus configured as shown in FIG. 7.

DETAILED DESCRIPTION

Figure 1:
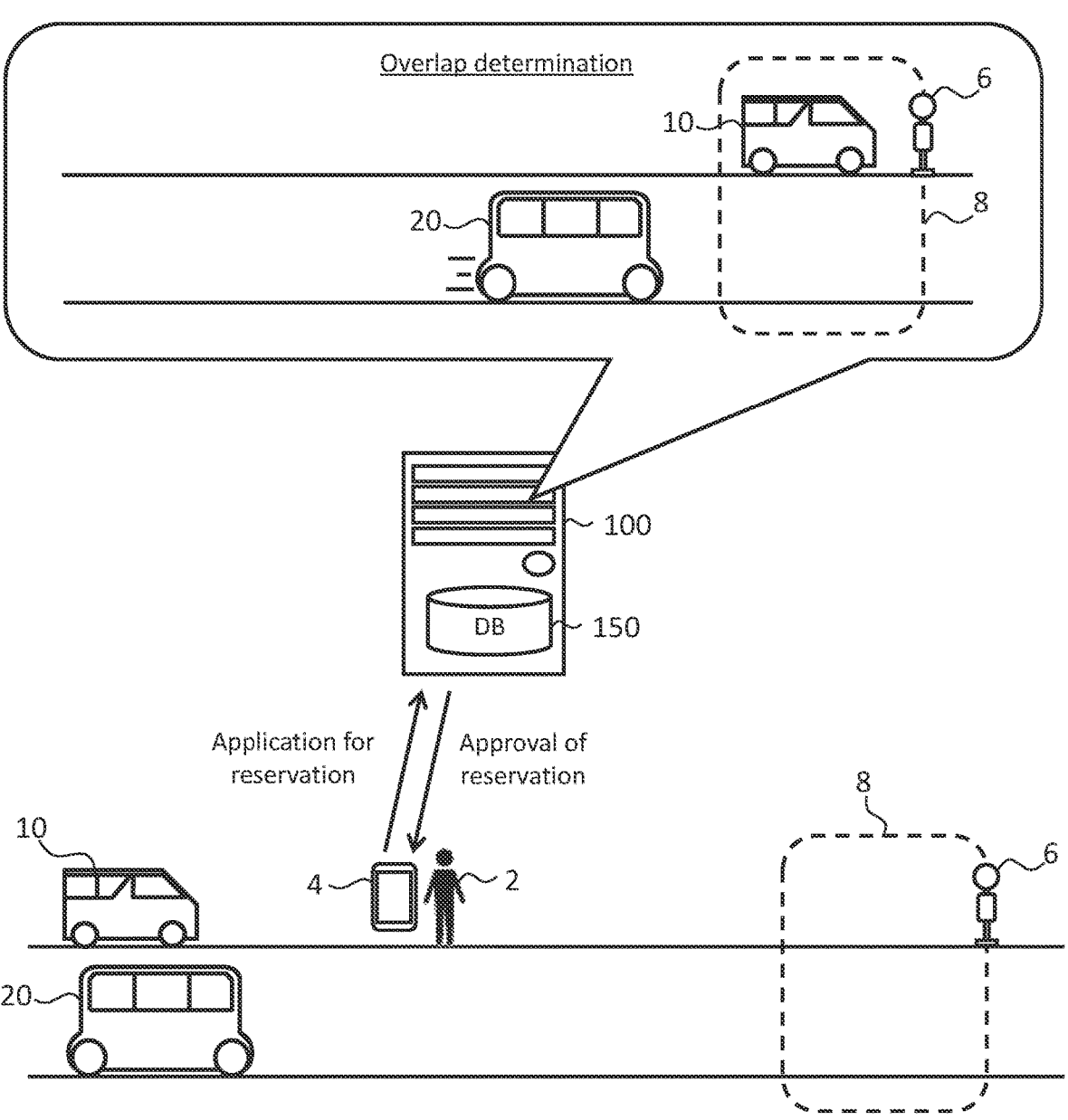
FIG. 1 is a diagram illustrating a method for determining whether to approve or disapprove a reservation according to an embodiment of the present disclosure.

1. Method for Determining Approval/Disapproval of Reservation

1-1. Outline of Determination Method

In an embodiment of the present disclosure, provision of a transportation service by using a transportation service vehicle is performed within a predetermined region. The region includes, for example, a smart city. A plurality of transportation service vehicles is used to provide the transportation service, and at least some of the transportation service vehicles are autonomous driving vehicles capable of autonomous driving. Vehicles to which the method for determining approval/disapproval of a vehicle reservation according to the present embodiment is applied are transportation service vehicles (also referred to as mobility-as-a-service (MaaS) vehicles) capable of autonomous driving. Hereinafter, a vehicle shall mean a transportation service vehicle capable of autonomous driving.

In the present embodiment, a plurality of types of transportation services are provided in the same region. Specifically, regular route bus service, on-demand bus service, and taxi service are provided within the same region. For each service, vehicles capable of autonomous driving are used as service providing means.

The regular route bus service is a transportation service in which a bus (regular route bus) on which a large number of people can ride is caused to travel along a predetermined route and is caused to stop at a predetermined bus stop in accordance with a predetermined timetable. When getting on the bus, the user waits for the arrival of the bus at the bus stop at a getting-on point, and when getting off the bus, the user presses a getting-off button in the bus to stop the bus at the bus stop at a getting-off point. Basically, the bus stops at the bus stop only when there is a user waiting at the bus stop and when there is a user getting off at the bus stop. When the regular route bus is a bus with seat designation such as a long-distance bus, a getting-on reservation with designation of a getting-on point and a getting-off point is required at the time of getting-on.

The regular route bus service includes a service form in which a bus is stopped at a predetermined bus stop regardless of whether or not a passenger gets on or off, and a door of the bus is opened or closed, such as a train. The regular route bus service having such a service form is particularly called a train type bus service. It can be said that the train type bus service is a transportation service in which a stopping time and a stopping point of a bus are reserved in advance by a service provider.

The on-demand bus service is a transportation service that receives a request from a user and arranges a ride-sharing bus (on-demand bus). The taxi service is a transportation service for arranging a taxi for personal use in response to a request from a user. In the on-demand bus service and the taxi service, a fixed traveling route and a fixed timetable are not determined as in the regular route bus service. The user can reserve the on-demand bus or the taxi by designating an arbitrary getting-on point or a getting-on point and a getting-on time. Further, the user can reserve the on-demand bus or the taxi by designating an arbitrary getting-off point or a getting-off point and a getting-off time in addition to the getting-on point and the getting-on time. The reservation of the getting-off point and the getting-off time can be made after getting on the vehicle.

In the regular route bus service, a predetermined point is used as a stopping point for stopping the regular route bus. On the other hand, in the on-demand bus service and the taxi service, an arbitrary point requested by the user can be designated as a stopping point of the on-demand bus or the taxi. However, since a place where a vehicle can be stopped is limited, there is a case where a stopping point of the on-demand bus or the taxi overlaps a stopping point of the regular route bus. A typical example is a drop-off place in a station rotary. If the station rotary is narrow, a limited space is available both for buses and for taxis. In addition, there may be a case where a bus stop of the regular route bus is designated as a getting-on point or a getting-off point of the on-demand bus or the taxi. In addition, place in front of a facility such as a hotel, a restaurant, or a hospital where many people visit by car is likely to be designated as a getting-on point and a getting-off point of the on-demand bus or the taxi.

As described above, when a plurality of types of transportation services are provided in the same area, a plurality of vehicles having different service types may simultaneously use the same stopping point. However, since there is a possibility that the autonomous driving vehicle cannot select a flexible action like a person, the autonomous driving vehicle cannot stop at an appropriate place indefinitely, and there is a possibility that a traffic jam occurs in the vicinity of a stopping point or a user is inconvenienced. For example, a combination of the regular route bus and the taxi is taken as an example. The regular route bus needs to leave from the stopping spot at a fixed time even if there is no user, whereas the taxi does not leave unless a user appears. Since the utilization rate of the taxi is sometimes high, or vice versa, if the regular fixed-route bus and the taxi use the same stopping point, mutual operation will be hindered.

Therefore, according to the method of the present embodiment, when there is an application for a reservation related to getting-on or an application for a reservation related to getting-off from a user, it is checked whether or not the reservation overlaps with operation schedules of other vehicles. When the overlap is detected, a priority order is determined between a vehicle for which the user applies for reservation (first transportation service vehicle, hereinafter referred to as a reservation requesting vehicle) and a vehicle having an operation schedule overlapping withe the reservation (second transportation service vehicle, hereinafter referred to as overlapping vehicle). Then, whether or not the reservation is approved is determined from the priority, and the determination result is notified to the user.

According to the method of the present embodiment, the priority is determined based on the respective service types of the reservation requesting vehicle and the overlapping vehicle. For example, in a case where there are three transportation services provided in a region, that is, the regular route bus service, the on-demand bus service, and the taxi service, the order of the priority is the regular route bus service, the on-demand bus service, and the taxi service.

That is, the higher the number of users and the greater the influence on the entire transportation service in the region, the higher the priority is set. It should be noted that the regular route bus service mentioned here includes the train type bus service.

According to the method of the present embodiment, the use of the stopping position is permitted to the vehicle of the service type having a large influence on the entire transportation service in the area among the reservation requesting vehicle and the overlapping vehicle. When the vehicle permitted to use the stopping position is the overlapping vehicle, the reservation application from the user is rejected. On the other hand, when the vehicle permitted to use the stopping position is the reservation requesting vehicle, the reservation application from the user is approved. In this case, the overlapping vehicle is instructed to change the operation schedule, that is, to change the stopping position or the stopping time.

1-2. Details of Determination Method

1-2-1. First Specific Example

Hereinafter, a method for determining approval/disapproval of a reservation will be described with a specific example. FIG. 1 is a diagram illustrating the first specific example of the method for determining whether to approve or disapprove the reservation.

In the first specific example, the vehicle that a user 2 desires to reserve, that is, the reservation requesting vehicle is a taxi 10. The user 2 who wants to use the taxi 10 applies for a reservation using a mobile terminal 4 represented by a smartphone, for example. The user 2 starts an application installed in the mobile terminal 4 and inputs a desired getting-on point and getting-on time on a reservation application screen displayed on the mobile terminal 4. Designation of the getting-on time is arbitrary. When the getting-on time is not designated in the reservation application, the vehicle that arrives at the getting-on point earliest is dispatched. The designation of the desired getting-off point and getting-off time can be reserved at the same time when the getting-on point and getting-on time are reserved, or can be reserved after the getting-on of the user. In the first specific example, it is assumed that all of the getting-on point, the getting-on time, the getting-off point, and the getting-off time are designated and the reservation is applied for.

The reservation application input to the mobile terminal 4 by the user 2 is transmitted to an operation management apparatus 100 via a communication network including a mobile communication system. The operation management apparatus 100 includes an operation schedule database 150. The operation schedule database 150 stores the operation schedule of the vehicle operated by a service provider in the region. The operation schedule includes at least a stopping place and a stopping time at which the vehicle stops next. Details of the function and the physical configuration of the operation management apparatus 100 will be described later.

Upon receipt of the reservation application for the taxi 10 from the user 2, the operation management apparatus 100 searches the operation schedule database 150 based on information included in the reservation. By this search, the presence or absence of a vehicle having an operation schedule overlapping with the getting-on point and the getting-on time designated by the user 2 is checked. When the getting-off point and the getting-off time are also designated in advance, the presence or absence of a vehicle having an operation schedule overlapping with the getting-off point and the getting-off time designated by the user 2 is checked.

FIG. 1 illustrates an example of overlap determination at a getting-off point by the operation management apparatus 100. The map data held by the operation management apparatus 100 has a certain area near the bus stop 6 set as the stopping point 8. Depending on the area and shape of the stopping point, a plurality of vehicles may be stopped at the stopping point. However, it is assumed that the number of vehicles that can stop at the stopping point 8 shown in the specific example is one.

According to the search result of the operation schedule database 150, the vehicles that are about to stop at the stopping point 8 include the regular route bus 20 in addition to the taxi 10. The operation management apparatus 100 determines whether there is an overlap between the stopping time during which the taxi 10 stops at the stopping point 8 and the stopping time during which the regular route bus 20 stops at the stopping point 8. In the first specific example, the taxi 10 stops at the stopping point 8, but the regular route bus 20 does not reach the stopping point 8. In this case, the operation management apparatus 100 determines that there is no overlap between the getting-off point and the getting-off time of the taxi 10 for which the reservation has been applied and the operation schedules of the other vehicles.

If there is no overlap with the operation schedules of other vehicles at the getting-on point and the getting-off point, the taxi 10 can be arranged according to the reservation. The operation management apparatus 100 approves the reservation and instructs the taxi 10 to arrive at the reserved getting-on point at the reserved time. At the same time, the operation management apparatus 100 notifies the user 2 that the reservation has been approved and updates the operation schedule of the taxi 10 registered in the operation schedule database 150.

1-2-2. Second Specific Example

Next, the second specific example of the method for determining approval/disapproval of a reservation will be described with reference to FIG. 2.

In the second specific example, similarly to the first specific example, the user 2 applies for a reservation for the taxi 10. Upon receipt of the reservation application for the taxi 10 from the user 2, the operation management apparatus 100 searches the operation schedule database 150 based on information included in the reservation. Then, the presence or absence of a vehicle having an operation schedule overlapping with the reservation applied by the user 2 is confirmed. In the second specific example, the vehicles that are about to stop at the stopping point 8 included in the reservation information include the regular route bus 20 in addition to the taxi 10.

Figure 2:
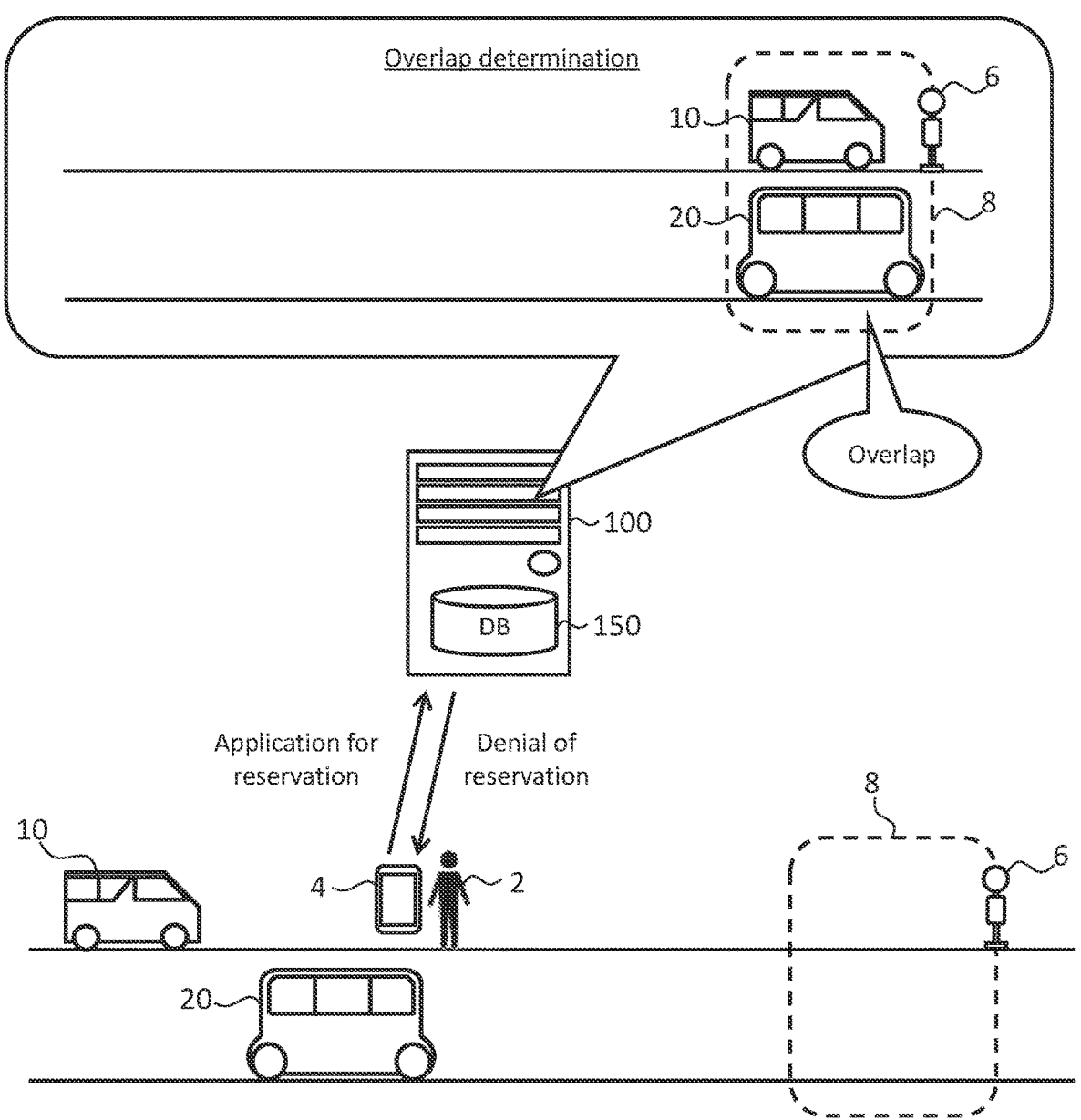
FIG. 2 is a diagram illustrating the method for determining whether to approve or disapprove a reservation according to the embodiment of the present disclosure.

FIG. 2 illustrates an example of overlap determination at a getting-off point by the operation management apparatus 100. According to the search result of the operation schedule database 150, the regular route bus 20 also stops at the stopping point 8 in the time period in which the taxi 10 stops at the stopping point 8. In this case, the operation management apparatus 100 determines that there is an overlap between the getting-off point and the getting-off time of the taxi 10 for which the reservation has been applied and the operation schedule of the regular route bus 20. That is, the regular route bus 20 is an overlapping vehicle for the taxi 10.

When there is an overlap in the stopping time at the stopping point 8 between the taxi 10 for which the user 2 applies for reservation and the regular route bus 20, the taxi 10 and the regular route bus 20 cannot stop at the stopping point 8 at the same time. In this case, the priority between the taxi 10 and the regular route bus 20 is determined. In the present embodiment, the regular route bus 20, which has a larger influence on the entire transportation service in the region, is set to have a higher priority than the taxi 10 which is used personally. The operation management apparatus 100 disapprove the reservation for the taxi 10 having a relatively low priority, and notifies the user 2 that the reservation is disapproved.

The user 2 notified of the disapproval of the reservation can request the operation management apparatus 100 to propose a method for moving to the stopping point 8. In a case where the transportation service for which the user 2 has applied for reservation is a service which can stop a service vehicle at an arbitrary point like the taxi service of the specific example 2, the operation management apparatus 100 can propose a stopping point at which reservation can be made. For example, if it is possible to reserve a point X meters away from the stopping point 8 for which the user 2 has applied a reservation, a proposal is made to stop the vehicle at that point. When the user 2 accepts the proposal, the operation management apparatus 100 notifies the user 2 that the reservation is approved, and registers the operation schedule of the taxi 10 created based on the proposal in the operation schedule database 150.

When there is an overlap in the stopping time at the stopping point 8 among three or more vehicles, it is necessary to propose a reservable stopping point for two or more vehicles that cannot stop at the stopping point 8. For example, when there are a user A and a user B whose reservations overlap with each other, a reservation for a point X meters away from the stopping point 8 may be proposed to both the user A and the user B. When the user A accepts the proposal first, the reservation for the point X meters away from the stopping point 8 is approved to the user A, and the reservation for a point Y meters (Y>X) away from the stopping point 8 is proposed to the user B. Alternatively, a reservation for the point X meters away from the stopping point 8 may be proposed to the user A, and a reservation for the point Y meters away from the stopping point 8 may be proposed to the user B from the beginning.

In addition, when a reservation for getting-on is possible but a reservation for getting-off is not possible as in the second specific example, the operation management apparatus 100 can propose a reservable stopping time at the stopping point 8. When the reservable stopping time is proposed for two or more vehicles, the proposed stopping time is shifted one by one. As a method for changing the stopping time, for example, making a detour to shift the arrival time at the stopping point 8 or adjusting the time at a place such as a stop where the vehicle can stand by may be considered. The user 2 can request one or both of a proposal of the reservable stopping point and a proposal of the reservable stopping time to the operation management apparatus 100.

When a proposal of a method for moving to the stopping point 8 is requested from the user 2 notified of the disapproval of the reservation, the operation management apparatus 100 can also propose use of another vehicle. For example, in a case where there is a vehicle that can arrive at the stopping point 8 at a time earlier than the time at which the taxi 10 to be reserved arrives and getting-off at the stopping point 8 can be reserved if using the vehicle, the use of the vehicle is proposed to the user 2. In addition, in a case where the user 2 can use another vehicle heading for the stopping point 8 if the user 2 moves from the current position, for example, the user 2 moves to the opposite lane, the movement from the current position and the use of another vehicle at the movement destination are proposed to the user 2. In the second specific example, if the user 2 can get on the regular route bus 20 by changing the getting-on point and the getting-on time, the use of the regular route bus 20 may be proposed to the user 2.

When the user 2 accepts one of the proposals, the operation management apparatus 100 may make compensation for the inconvenience given to the user 2. In the service type such as the taxi 10, the charge is added according to the distance. However, it is not preferable for the user 2 that the distance is increased for the convenience of the service provider and the charge is increased. Therefore, the cheaper one of the "fare calculated from a getting-on point and a getting-off point at the time of reservation" and the "fare calculated from an actual getting-on point and an actual getting-off point" may be adopted. Alternatively, the fare may be charged as it is, and a discount coupon for the fare that can be used next time may be issued instead.

1-2-3. Third Specific Example

Next, the third specific example of the method for determining approval/disapproval of a reservation will be described with reference to FIG. 3.

In the third specific example, the vehicle that the user 2 desires to reserve, that is, the reservation requesting vehicle is the regular route bus 20. The mobile terminal 4 is not necessary for using the regular route bus 20, and the regular route bus 20 can be used by waiting for the arrival of the regular route bus 20 at the bus stop. The user 2 gets on the regular route bus 20 scheduled to arrive at a bus stop 6 of a destination at a desired time. Which regular route bus arrives at the bus stop 6 and when can be checked from a timetable set at the bus stop or a timetable on the Internet.

The user 2 who gets on the regular route bus 20 presses a getting-off button 50 installed in the bus to inform the regular route bus 20 of the intention of getting off the bus at the next bus stop. In the case of the regular route bus 20, the user 2 presses the getting-off button 50 to apply for a reservation of stop. The application for the reservation of stop input by the user 2 pressing the getting-off button 50 is transmitted from the regular route bus 20 to the operation management apparatus 100 via a communication network including a mobile communication system.

The operation management apparatus 100 receives the application for the reservation of stop of the regular route bus 20 from the user 2 and searches an operation schedule database 150 by information included in the reservation. By this search, the presence or absence of a vehicle having an operation schedule overlapping with the getting-off point and the getting-off time designated by the user 2 is checked. In the case of the regular route bus 20, the searched getting-off point is the next bus stop 6, and the searched getting-off time is the arrival time at the bus stop 6 registered in the timetable of the regular route bus 20.

Figure 3:
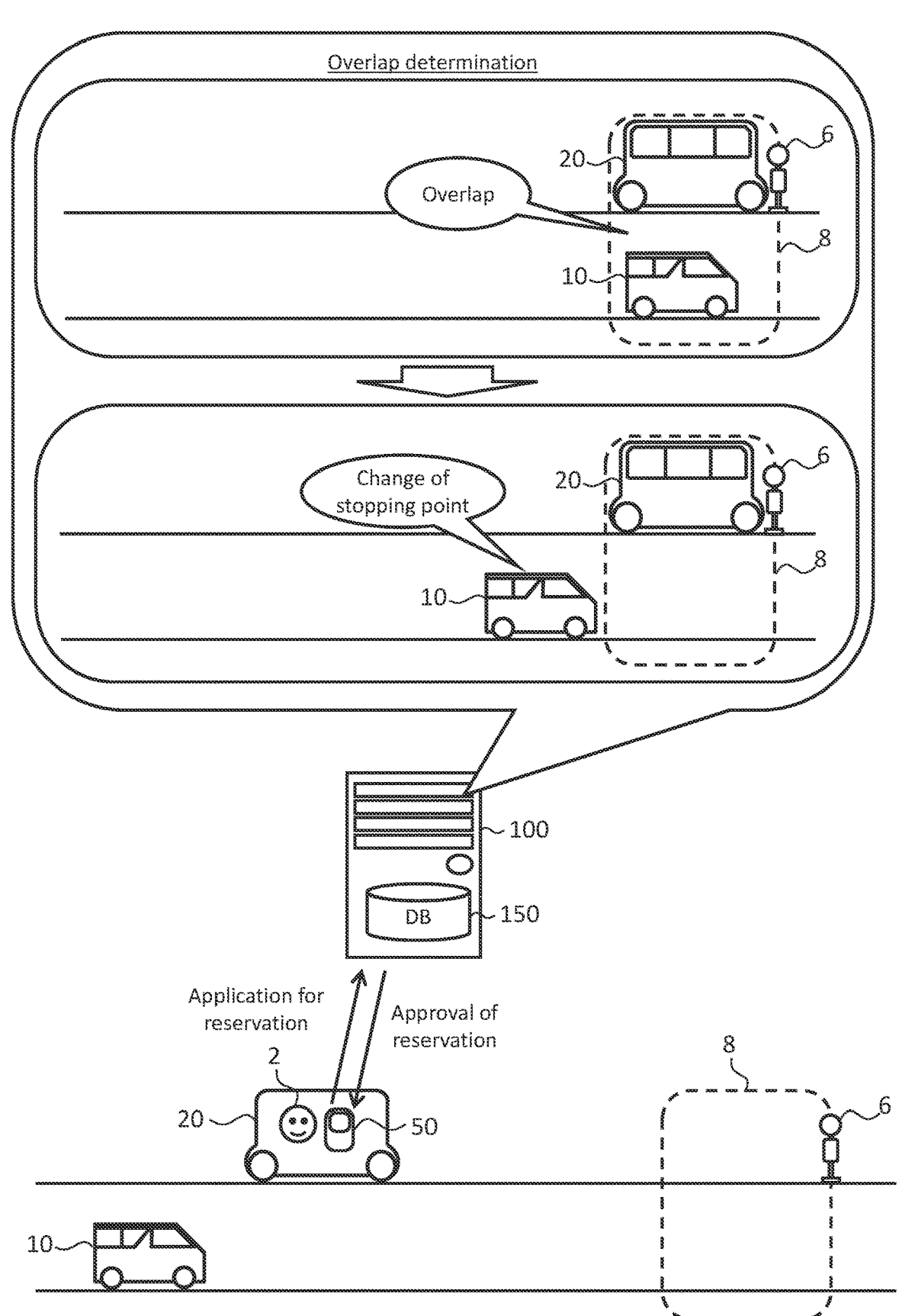
FIG. 3 is a diagram illustrating the method for determining whether to approve or disapprove a reservation according to the embodiment of the present disclosure.

FIG. 3 illustrates an example of overlap determination at a getting-off point by the operation management apparatus 100. According to the search result of the operation schedule database 150, the vehicles that are about to stop at the stopping point 8 include the taxi 10 in addition to the regular route bus 20. The operation management apparatus 100 determines whether there is an overlap between the stopping time during which the taxi 10 stops at the stopping point 8 and the stopping time during which the regular route bus 20 stops at the stopping point 8. In the third specific example, the taxi 10 also stops at the stopping point 8 during the time period in which the regular route bus 20 stops at the stopping point 8. In this case, the operation management apparatus 100 determines that there is an overlap between the getting-off point and the getting-off time of the regular route bus 20 for which the reservation has been applied and the operation schedule of the taxi 20. That is, the taxi 10 is an overlapping vehicle for the regular route bus 20.

When there is an overlap in the stopping time at the stopping point 8 between the regular route bus 20 for which the user 2 applies for reservation and the taxi 10, the priority between the regular route bus 20 and the taxi 10 is determined. In the present embodiment, the regular route bus 20 is set higher in priority than the taxi 10. The operation management apparatus 100 approves the reservation for the regular route bus 20 having a relatively high priority, and instructs the regular route bus 20 to stop at the next bus stop 6 according to the timetable. At the same time, the operation management apparatus 100 notifies the user 2 that the reservation has been approved, and updates the operation schedule of the regular route bus 20 registered in the operation schedule database 150.

The operation management apparatus 100 instructs the taxi 10 to change the operation schedule for avoiding the stopping time at the stopping point 8 from overlapping with the regular route bus 20. In the third specific example, it is instructed to shift the stopping point of the taxi 10 from the stopping point 8. The operation management apparatus 100 registers the changed operation schedule of the taxi 10 in the operation schedule database 150.

Simultaneously with the instruction to the taxi 10, the operation management apparatus 100 notifies the user of the taxi 10 that the stopping point 8 has been changed. The notification to the user of the taxi 10 may be performed by a speaker or a display installed in the cabin of the taxi 10, or may be performed via a mobile terminal carried by the user. In addition, compensation may be made for inconvenience from the operation management apparatus 100 to the user of the taxi 10. For example, the fare may be discounted, or a discount coupon for a fare that can be used next may be issued.

Here, three possible cases will be described in detail for the notification to the user of the overlapping vehicle and the instruction to change the operation schedule for the overlapping vehicle when the reservation requesting vehicle is prioritized.

Case A. Case where Overlapping of Stopping Times is a Problem, and the Problem can be Solved by Shortening the Getting-On Time and Getting-Off Time of the User Users of the overlapping vehicle are notified that the getting-on/getting-off time will be short, and are requested to prepare for smooth getting-on/getting-off before arrival. Users who have already got on the overlapping vehicle is notified by in-vehicle broadcasting, and users who are going to get on the overlapping vehicle are notified by a portable terminal or broadcasting equipment installed at a getting-on/getting-off point.

The autonomous driving system of the overlapping vehicle is assisted by a remote operator at a remote location so that the autonomous driving system can take action as soon as possible. For example, in a case where the autonomous driving system is provided with a remote assistance system that requests remote assistance from a remote operator when the autonomous driving system cannot perform autonomous determination, if there is a free remote operator, the remote assistance is requested before performing autonomous determination. In addition, both the autonomous determination and the remote assistance may be used, and the response may be hastened by adopting the input which gives the determination result earlier. Specific examples of using both autonomous determination and remote assistance include confirmation of safety in the vicinity of a door, determination of necessity of a slope for a wheelchair, determination of start, and the like.

Case B. Case where Overlapping of Stopping Times is a Problem, and the Problem can be Solved by Delaying the Arrival Time Uses of the overlapping vehicle are notified that the arrival time will be late. The notification method is the same as that in case A. The autonomous driving system of the overlapping vehicle is instructed to lengthen the stopping time at the bus stop on the way so as to delay the arrival time. In addition, it may be instructed to change the travel route to such an extent that there is no problem in getting-on and getting-off. The travel route may be calculated in the vehicle or may be calculated by a server outside the vehicle.

Case C. Case where Overlapping of Stopping Times is a Problem, and the Problem can be Solved by Quickening the Arrival Time Users of the overlapping vehicle are notified that the arrival time will be earlier. The notification method is the same as that in case A. The autonomous driving system of the overlapping vehicle is instructed to shorten the stopping time at the bus stop on the way so as to quicken the arrival time. In addition, it may be instructed not to stop at a stop at which a passenger is not scheduled to get off and there is no user, or not to open or close a door even if the vehicle stops. When there is a user at the bus stop, the user may be requested to get on another vehicle, or the reservation content of the user may be updated so as to get on another vehicle.

2. Operation Management Apparatus Apparatus as Reservation Approval/Disapproval Determination Apparatus

Figure 4:
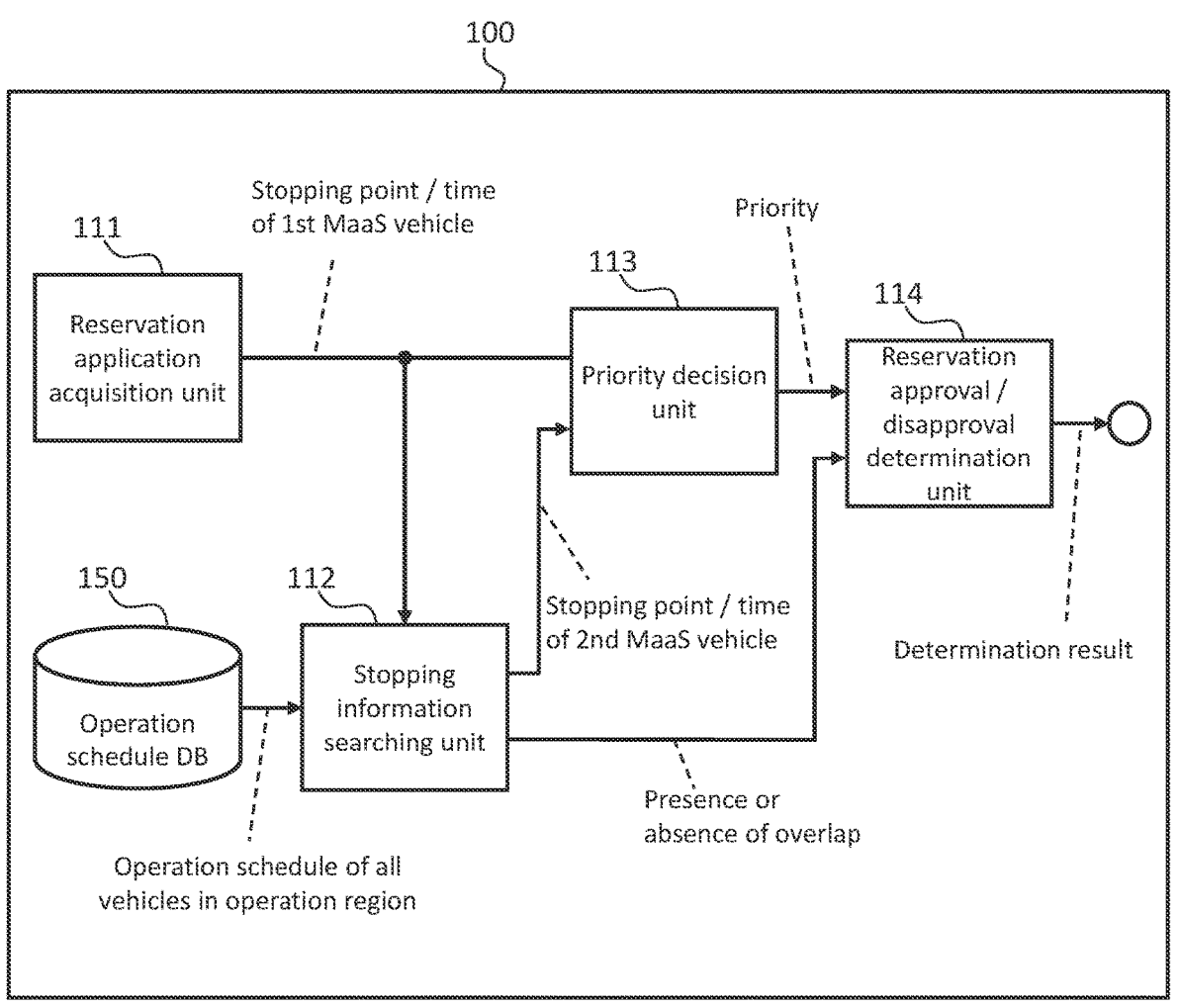
FIG. 4 is a block diagram illustrating an example of a configuration of a reservation approval/disapproval determination apparatus according to the embodiment of the present disclosure.

2-1. Configuration of Reservation Approval/Disapproval Determination Apparatus As described above, the operation management apparatus 100 functions as a reservation approval/disapproval determination apparatus that determines approval/disapproval of a reservation from a user. In other words, the operation management apparatus 100 includes the reservation approval/disapproval determination apparatus as one application. FIG. 4 is a block diagram illustrating an example of a configuration of the operation management apparatus 100 as the reservation approval/disapproval determination apparatus. The operation management apparatus 100 as the reservation approval/disapproval determination apparatus includes a reservation application receiving unit 111, a stop information searching unit 112, a priority decision unit 113, and a reservation approval/disapproval determination unit 114 in addition to the operation schedule database 150 described above.

The operation schedule database 150 is a database that stores information on stopping points and stopping times of all vehicles operated in a certain region. The information is associated with service types of vehicles. When a database is created for each MaaS service provider, the operation schedule database 150 is configured by connecting the databases online.

The form of information stored in the operation schedule database 150 is basically a combination of a stopping point and a stopping time for each vehicle. For example, a getting-on point and a getting-off point are information to be distinguished from each other for a single user, but may be stored in the database as a stopping point for a vehicle. Similarly, a getting-on time and a getting-off time are information to be distinguished from each other for a single user, but may be stored in the database as a stopping time for a vehicle. However, the information may be stored in the form of an arrival time, a departure time, a waiting time, or the like on the basis of the fact that the vehicle is stopped at the stopping point for a predetermined time.

The reservation application receiving unit 111 is configured to receive, from a user, an application for a reservation related to at least one of a point and a time at which the vehicle that the user desire to reserve (hereinafter referred to as a reservation requesting vehicle: a first transportation service vehicle) is to be stopped. More specifically, the reservation application includes information related to any one of a getting-on point, a getting-on time, a getting-off point, and a getting-off time, or a combination thereof.

Examples of the input means for the user to input the application for reservation include a mobile terminal (smartphone or tablet), a PC site, a telephone, a ticket-vending machine, a call button, and a get-off button.

With respect to the portable terminal, the PC site, and the telephone, all of them can be designated by a combination of applications, or reservation can be made by limiting to any information. For example, when "I want to get on immediately" is input from the mobile terminal, GPS information indicating a current position and time information of the mobile terminal are combined, and reservation information specifying the combination of a getting-on/getting-off point and a getting-on/getting-off time is generated. There may be a case where the getting-on/getting-off point is preferentially designated and the getting-on/getting-off time is not designated.

With respect to the ticket-vending machine, there are a case where only a getting-on point and a getting-off point are input as in the case of a reservation for an unreserved seat of the Shinkansen train and a case where all information is input as in the case of a reservation for a reserved seat. Alternatively, only a getting-on point may be designated as in the case of an ordinary train ticket. With respect to the call button, a getting-on point and a getting-on time are input as reservation information. With the getting-off button, a getting-off point and a getting-off time are input as reservation information.

The stop information searching unit 112 is configured to search the operation schedule database 150 for database information overlapping withe the reservation information based on the reservation information included in the reservation application received by the reservation application receiving unit 111. In other words, the overlap between the reservation for the reservation requesting vehicle that the user desires to reserve and the operation schedule of the other vehicles is detected. When a vehicle having database information overlapping with the reservation information, that is, an overlapping vehicle is found as a result of the search, the database information related to the overlapping vehicle is extracted from the operation schedule database 150.

It is expected that the database information of the operation schedule database 150 is defined by a band-like time from the arrival time to the departure time. On the other hand, the reservation information may be defined by a band-like time or may be defined by a point such as a getting-on time. The overlap between the reservation information and the database information includes a case where one time period and another time period overlap and a case where a time period and a time point overlap.

Although it is desirable that the arrival time and the departure time are strictly adhered to, there is a possibility that the scheduled time cannot always be adhered to depending on traffic conditions or the number of passengers. Therefore, when searching for the overlap between the reservation information and the database information, it is more realistic to not only strictly determine the overlap but also determine the overlap with a certain allowable error (for example, about 10 seconds) in time. In addition, in the case of a transportation service in which a vehicle can stop at an arbitrary place such as a taxi, an allowable error may be provided not only for the determination of the overlap of stopping times but also for the determination of the overlap of stopping points. For example, in a case where the stopping point is separated by only several meters between the reservation information and the database information, both may be considered to overlap each other.

The priority decision unit 113 is configured to determine the priority between the reservation requesting vehicle and the overlapping vehicle. As described in the section "Method for determining approval/disapproval of reservation", the priority is determined based on the service types of the reservation requesting vehicle and the overlapping vehicle. However, there is also a case where the service types of both vehicles are the same, such as a case where both the reservation requesting vehicle and the overlapping vehicle are taxis. In this case, the priority is determined according to any one of the following determination methods.

A first method for determining the priority is to prioritize a vehicle reserved first according to the first come-first-served concept. In this case, the overlapping vehicle whose database information is already registered in the operation schedule database 150 at the time when the reservation is applied is given priority.

A second method for determining the priority is to prioritize a vehicle having a large number of passengers. In this case, it is assumed that both the reservation information received from the user and the database information of the operation schedule database 150 include information on the number of occupants. If the service type is the same, vehicles carrying many occupants will have a larger influence on the entire transportation service in the region. Therefore, by reflecting the number of occupants in the priority, smooth provision of the transportation service in the region is achieved.

A third method for determining the priority is to determine the priority based on the length of the stopping time. For example, a service provided by a vehicle having a short stopping time (waiting time) can meet the demands of a large number of people with a higher working rate than a service provided by a vehicle waiting for a long time at the bus terminal without a passenger getting on or off. Therefore, according to the third determination method, a vehicle having a short stopping time is prioritized over a vehicle having a long stopping time.

Here, it is assumed that a bus terminal is arranged near a station and there is a plurality of stopping points therein. In this case, a vehicle having a short stopping time is preferentially stopped at a stopping point near the station in the terminal. On the other hand, a vehicle having a long stopping time is preferentially stopped at a stopping point away from the station in the terminal. As described above, two viewpoints of the length of the stopping time and the ease of access to the stopping point may be used as criteria for determining the priority.

A fourth method for determining the priority is to determine the priority based on the priority of the user. For example, a vehicle used by a user with a high degree of urgency may be given priority over other vehicles. To be more specific, a vehicle on which an emergency patient rides and a vehicle on which a pregnant woman who is about to water broke will ride are prioritized over other vehicles. Further, a reservation by a user having a preferential right such as a fast ticket may be prioritized.

A fifth method for determining the priority is to prioritize a vehicle scheduled to be connected to another traffic infrastructure. That is, when a connection with another traffic infrastructure such as another bus or train is scheduled in an operation schedule, a vehicle having the operation schedule is prioritized over the other vehicles. According to this, it is possible to provide smooth transportation services for the entire region, including connection between traffic infrastructures.

The reservation approval/disapproval determination unit 114 is configured to determine whether or not the reservation applied by the user can be approved based on the presence or absence of the overlap determined by the stop information searching unit 112 and the priority determined by the priority decision unit 113. Specifically, the approval/disapproval of the reservation is determined based on the priority of the reservation applied by the user, that is, the priority of the reservation requesting vehicle among the vehicles scheduled to stop at the stopping position. Specifically, when the vehicles scheduled to stop at the stopping position are sorted in accordance with the priority and the priority rank of the reservation requesting vehicle is compared with the lowest rank at which the vehicle can stop at the stopping point, if the priority rank of the reservation requesting vehicle is equal to or higher than the lowest rank, the reservation requesting vehicle can stop at the stopping point. In this case, the reservation approval/disapproval determination unit 114 approves the reservation applied by the user and notifies the user of the approval of the reservation. As described in the third specific example of the method for determining approval/disapproval of the reservation, when the reservation requesting vehicle is prioritized over the overlapping vehicle, the overlapping vehicle is instructed to change the operation schedule thereof, and the occupant of the overlapping vehicle is notified of the change in the operation schedule.

On the other hand, when the vehicles scheduled to stop at the stopping position are sorted in accordance with the priority and the priority rank of the reservation requesting vehicle is compared with the lowest rank at which the vehicle can stop at the stopping point, if the priority rank of the reservation requesting vehicle is lower than the lowest rank, the reservation requesting vehicle cannot stop at the stopping point. In this case, the reservation approval/disapproval determination unit 114 disapproves the reservation applied by the user and notifies the user of the disapproval of the reservation. As described in the second specific example of the method for determining approval/disapproval of the reservation, when the disapproval of the reservation is notified to the user, another method for moving to the destination is also proposed to the user. This proposal is executed by an application different from the reservation approval/disapproval determination apparatus included in the operation management apparatus 100.

2-2. Processing by Reservation Approval/Disapproval Determination Apparatus

Figure 5:
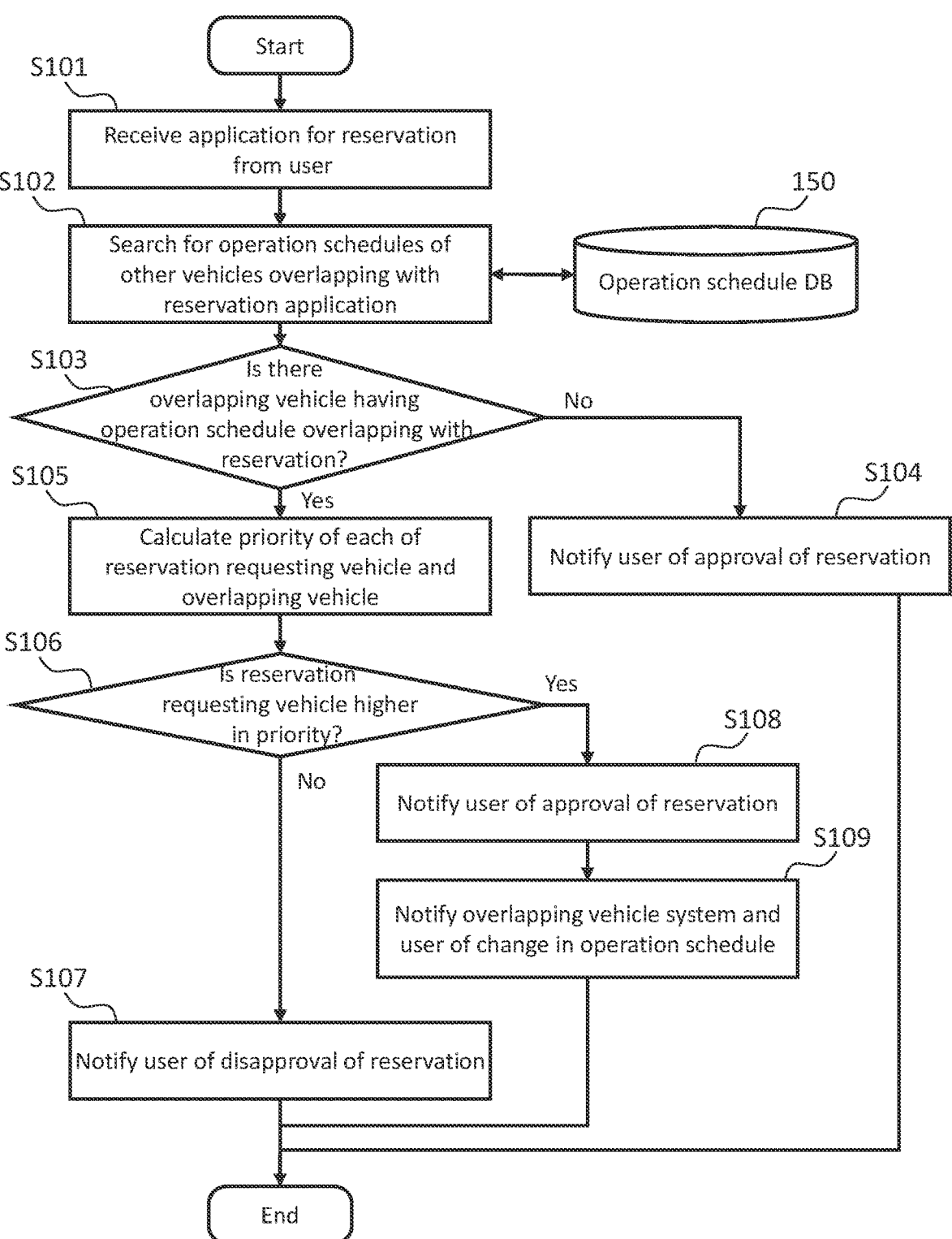
FIG. 5 is a flowchart illustrating an example of processing executed by the reservation approval/disapproval determination apparatus configured as shown in FIG. 4.

Next, processing executed by the reservation approval/disapproval determination apparatus configured as described above will be described with reference to FIG. 5. FIG. 5 is a flowchart illustrating an example of processing executed by the reservation approval/disapproval determination apparatus.

In step S101, the reservation request receiving unit 111 receives an application for a reservation from a user. The application for the reservation includes information on at least one of a point and a time at which a vehicle for which the reservation is desired (reservation requesting vehicle) is to be stopped.

In step S102, the stop information searching unit 112 searches the operation schedule database 150. By the search, the operation schedule of other vehicles overlapping with the reservation applied by the user is extracted.

Subsequently, in step S103, the stop information searching unit 112 determines whether or not there is an overlapping vehicle, that is, a vehicle having an operation schedule overlapping with the reservation applied from the user. The search result of the stop information searching unit 112 is input to the priority decision unit 113, and the determination result is input to the reservation approval/disapproval determination unit 114.

If it is determined in step S103 that there is no overlapping vehicle, the processing proceeds to step S104. In step S104, the reservation approval/disapproval determination unit 114 approves the reservation and notifies the user of the approval of the reservation.

If it is determined in step S103 that there is an overlapping vehicle, the processing proceeds to step S105. In step S105, the priority of each of the reservation requesting vehicle and the overlapping vehicle is calculated by the priority decision unit 113.

Subsequently, in step S106, the priority decision unit 113 determines whether or not the reservation requesting vehicle has a higher priority than the overlapping vehicle. The determination result of the priority decision unit 113 is input to the reservation approval/disapproval determination unit 114.

If it is determined in step S106 that the overlapping vehicle has a higher priority, the processing proceeds to step S107. In step S107, the reservation approval/disapproval determination unit 114 disapproves the reservation and notifies the user of the disapproval of the reservation.

When it is determined in step S106 that the priority of the reservation requesting vehicle is higher, the process proceeds to step S108. In step S108, the reservation approval/rejection determination unit 114 approves the reservation and notifies the user of the approval of the reservation.

Subsequently, in step S109, the reservation approval/disapproval determination unit 114 notifies the autonomous driving system and the user of the overlapping vehicle of the change in the operation schedule.

3. Method of Deciding Stopping Position

The method for determining approval/disapproval of reservation according to the present embodiment described above is a method that contributes to suppression of confusion caused by vehicles exceeding the number of vehicles that can be stopped gathering at a stopping point during the same time period. However, even if the number of vehicles gathering at the stopping point is equal to or less than the number of vehicles that can be stopped, if the stopping position of the vehicle that has stopped earlier is not appropriate, smooth stop of the vehicle that comes later is prevented and disturbance occurs in the traffic flow. The method for deciding a stopping position according to the present embodiment is a method that achieves smooth stop of vehicles at the stopping point.

Figure 6A:
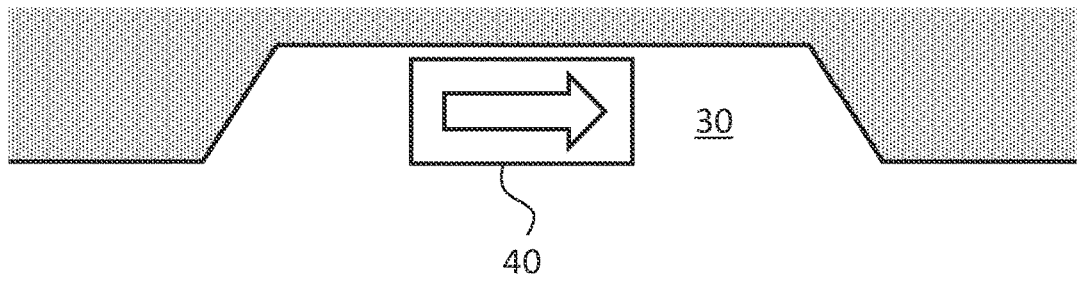
FIG. 6A is a diagram illustrating a method for deciding a stopping position according to the embodiment of the present disclosure.

FIGS. 6A, 6B, 6C and 6D are diagrams illustrating a method of deciding a stopping position according to the present embodiment. As shown in FIG. 6A, the stopping point 30 is an area having a certain area provided along the road. The original stopping position of the vehicle 40 at the stopping point 30 is a position where the vehicle 40 is most likely to stop and start, for example, the center position of the stopping point 30 as shown in FIG. 6A. The method for deciding the stopping position is not affected by the service type of the vehicle 40. That is, the vehicle 40 may be a regular route bus, an on-demand bus, or a taxi.

Figure 6B:
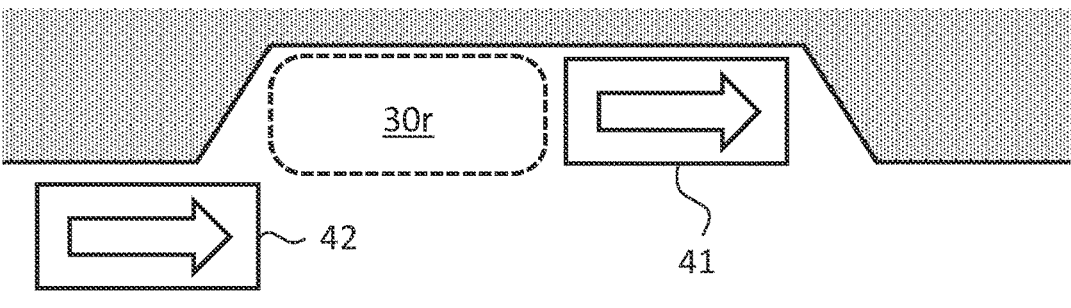
FIG. 6B is a diagram illustrating a method for deciding a stopping position according to the embodiment of the present disclosure.
Figure 6C:
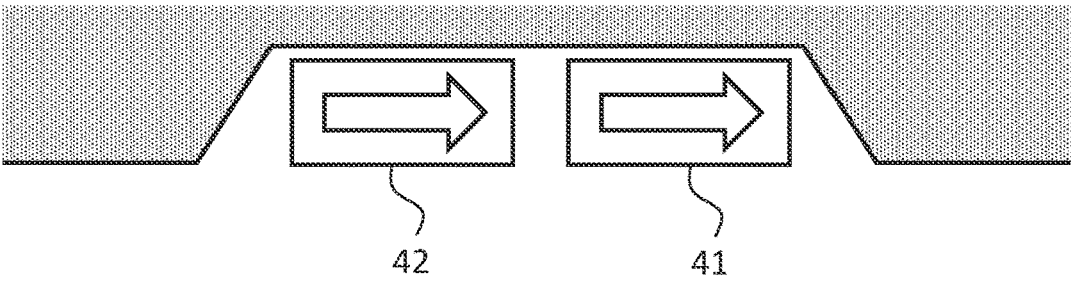
FIG. 6C is a diagram illustrating a method for deciding a stopping position according to the embodiment of the present disclosure.
Figure 6D:
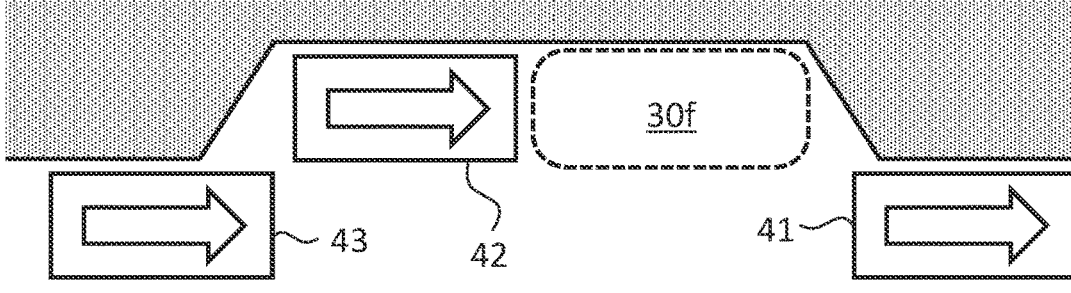
FIG. 6D is a diagram illustrating a method for deciding a stopping position according to the embodiment of the present disclosure.

The method for deciding the stopping position according to the present embodiment is a method for deciding a stopping position in a case where a plurality of vehicles gather at the stopping point 30 in the same time period. As shown in FIG. 6B, when two vehicles 41 and 42 arrive at the stopping point 30 in succession, the first arriving vehicle 41 is stopped at a position offset forward from the original stopping position. Since the vehicle 41 arriving earlier stops at the front side, an empty space 30r is formed behind the vehicle 41, and a stopping place for the vehicle 42 arriving later is secured. As a result, the vehicle 42 arriving later can stop behind the vehicle 41 arriving earlier as shown in FIG. 6C.

In a case where the third vehicle 43 arrives while the two vehicles 41 and 42 are stopped, the vehicle 43 waits behind the stopping point 30. Then, when one of the two vehicles 41 and 42 departs, the vehicle 43 enters the vacant place and stops. In the example shown in FIG. 6D, since the vehicle 41 ahead departs first, an empty space 30f is formed in front of the vehicle 42, and a stopping place for the vehicle 43 arriving later is secured. In this way, the vehicles are sequentially stopped in the vacant spaces that are sequentially formed, and thus it is possible to suppress disturbance of the traffic flow due to a plurality of vehicles that have arrived in the same time period.

It can be determined on the basis of the operation schedule of each vehicle registered in the operation schedule database 150 what number the vehicle arrived at the stopping point 30 is and whether there is a space where the vehicle can stop. Specifically, by searching the operation schedule database 150, it is possible to detect vehicles whose stopping times overlap with each other. The order of arrival between vehicles whose stopping times overlap can be determined from the operation schedule of each vehicle. If the order in which each vehicle arrives at the stopping point 8 is known, the stopping position can be determined for each vehicle according to the above-described method for deciding the stopping position.

In FIGS. 6A, 6B, 6C, and 6D, the stopping position of the vehicle arriving earlier is offset in the vertical direction for the vehicle arriving later, but the concept of the method for deciding the stopping position described above can be applied to other methods. For example, according to the concept of the method for deciding the stopping position described above, the stopping position of the vehicle that has arrived earlier may be offset in the lateral direction, the stopping direction of the vehicle that has arrived earlier may be rotated, or these may be combined as appropriate.

4. Operation Management Apparatus as Stopping Position Decision Apparatus

4-1. Configuration of Stopping Position Decision Apparatus

4-1-1. First Example

Figure 7:
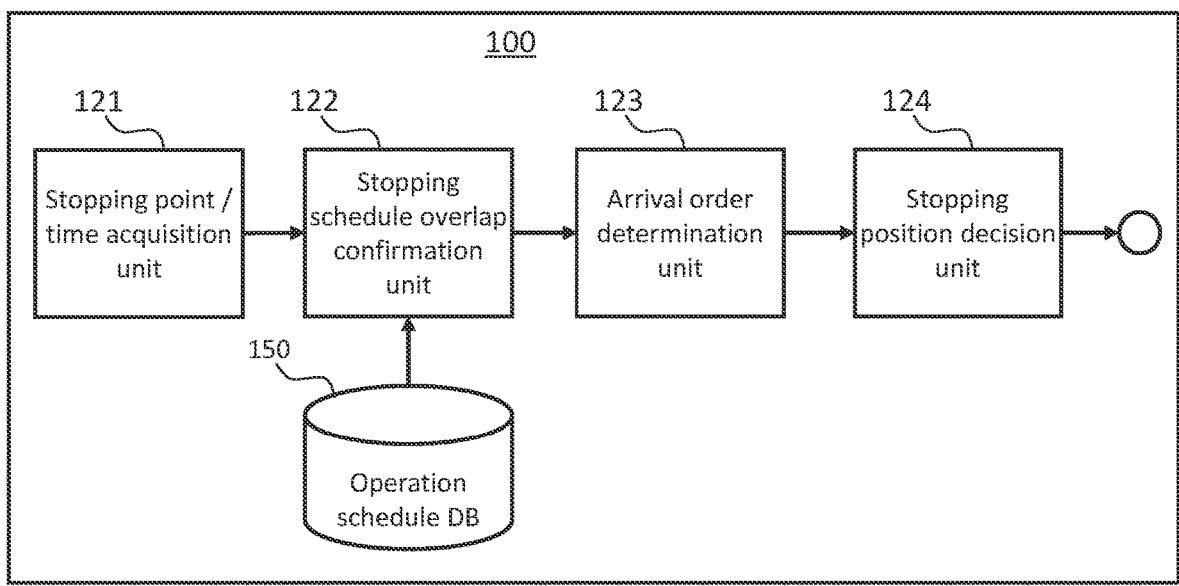
FIG. 7 is a block diagram illustrating a first example of a configuration of a stopping position decision apparatus according to the embodiment of the present disclosure.

The above-described method for deciding the stopping position is executed by the operation management apparatus 100. That is, the operation management apparatus 100 functions as a stopping position decision apparatus that decides stopping positions of a plurality of vehicles that have arrived at a stopping point in the same time period. In other words, the operation management apparatus 100 includes the stopping position decision apparatus as one application. FIG. 7 is a block diagram illustrating the first example of the configuration of the operation management apparatus 100 as the stopping position decision apparatus. In the first example, the operation management apparatus 100 as the stopping position decision apparatus includes a stopping point/time acquisition unit 121, a stopping schedule overlap confirmation unit 122, an arrival order determination unit 123, and a stopping position decision unit 124 in addition to the operation schedule database 150 described above.

The information stored in the operation schedule database 150 is as described above. Information on a stopping point and a stopping time is stored in association with vehicle information. The vehicle information is information capable of identifying an individual vehicle. However, in the implementation of the method for deciding the stopping position according to the present embodiment, the information on the service type of each vehicle is not necessarily required.

The stopping point/time acquisition unit 121 is configured to acquire a scheduled stopping point and stopping time when a certain vehicle (target vehicle) is scheduled to stop. Stopping schedule information related to the stopping point and the stopping time may be acquired from the target vehicle or may be acquired from the user of the target vehicle. When the user applies for reservation relating to at least one of a point and a time for stopping the vehicle, information included in the application is acquired as the stopping schedule information. Note that the stopping point acquired by the stopping point/time acquisition unit 121 may be not only the scheduled next stopping point of the vehicle but also a stopping point further ahead.

The stopping schedule overlap confirmation unit 122 is configured to search the operation schedule database 150 for database information overlapping with the stopping schedule information based on the stopping schedule information acquired by the stopping point/time acquisition unit 121. By this search, the presence or absence of vehicles having overlapping stopping schedule is confirmed. Note that the overlap between the stopping schedule information and the database information includes a case where one time period and another time period overlap and a case where a time period and a time point overlap. In addition, when searching for the overlap between the stopping schedule information and the database information, the presence or absence of the overlap is determined by providing a certain degree of tolerance in time or distance.

The arrival order determination unit 123 is configured to determine the arrival order at the stopping point for each vehicle between vehicles having overlapping stopping schedules confirmed by the stopping schedule overlap confirmation unit 122. When the overlap of the stopping times is interrupted halfway, that is, when there is no vehicle in the stop state, the calculation of the arrival order is reset. Then, when the overlap of stopping schedules occurs next time, the arrival order is determined again.

The stopping schedule information of each vehicle registered in the operation schedule database 150 is used to determine the arrival order. In this case, it is preferable that detailed service states such as "traveling, x meters to the stopping point, arrival at the stopping point, start of getting on/off, end of getting on/off, preparation for departure, and completion of departure" are registered in the database information. If the accuracy of the GPS mounted on each vehicle is high and the management system disposed outside the vehicle accurately grasps the positional relationship of each vehicle, each vehicle can know its own arrival order by inquiring of the management system. Also, each vehicle can know its own arrival order by vehicle-to-vehicle communication between vehicles.

The stopping position decision unit 124 is configured to decide the stopping position of each vehicle at the stopping point based on the arrival order determined by the arrival order determination unit 123. In accordance with the method for deciding the stopping position according to the present embodiment, a vehicle that arrives at the stopping point earlier is stopped at an offset position from the original stopping position, and a stopping place for a vehicle that arrives later is secured.

4-1-2. Second Example

Figure 8:
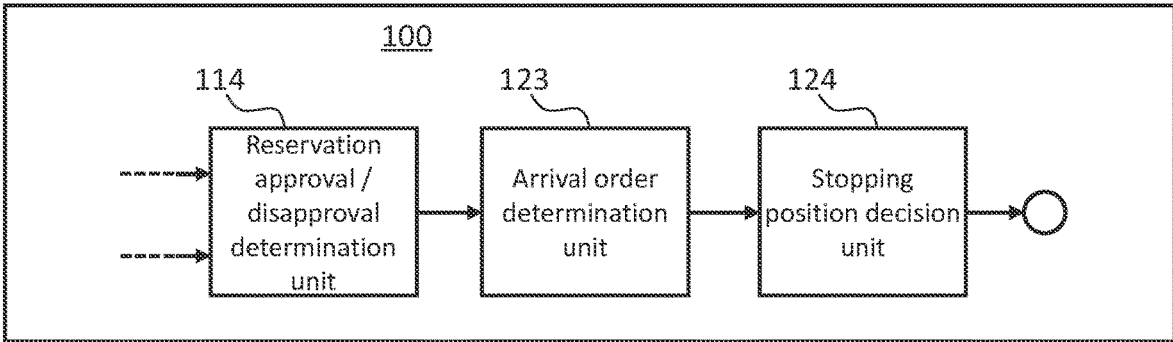
FIG. 8 is a block diagram illustrating a second example of a configuration of the stopping position decision apparatus according to the embodiment of the present disclosure.

In the second example, the stopping position decision apparatus is combined with the reservation approval/disapproval determination apparatus. That is, in the operation management apparatus 100, the stopping position decision apparatus is prepared as an application integrated with the reservation approval/disapproval determination apparatus. FIG. 8 is a block diagram illustrating the second example of the configuration of the operation management apparatus 100 as the stopping position decision apparatus. The stopping position decision apparatus integrated with the reservation approval/disapproval determination apparatus includes the arrival order determination unit 123 and the stopping position decision unit 124.

In the second example, the output of the reservation approval/disapproval determination unit 114 is input to the arrival order determination unit 123. The information input from the reservation approval/disapproval determination unit 114 to the arrival order determination unit 123 includes information on the overlap between the reservation requesting vehicle and the overlapping vehicle. The arrival order determination unit 123 determines the arrival order between the reservation requesting vehicle and the overlapping vehicle based on the input information. Then, based on the arrival order determined by the arrival order determination unit 123, the stop positions of the reservation requesting vehicle and the overlapping vehicle at the stopping point are determined by the stopping position decision unit 124. Thus, the overlap between the reservation requesting vehicle and the overlapping vehicle is eliminated.

4-1-3. Third Example

Figure 9:
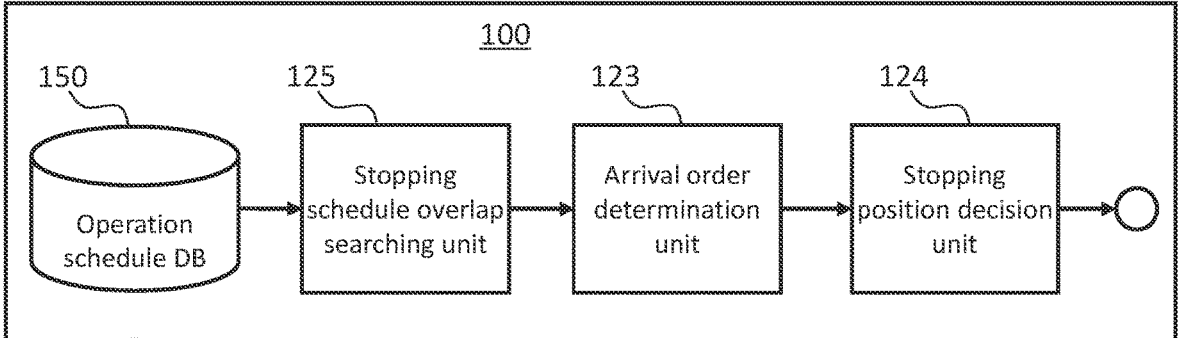
FIG. 9 is a block diagram illustrating a third example of a configuration of the stopping position decision apparatus according to the embodiment of the present disclosure.

In the above-described first example, the method for determining the stopping position is performed using the fact that a certain vehicle is scheduled to stop as a trigger. On the other hand, in the third example, the method for determining the stopping position is performed with the update of the operation schedule database 150 as a trigger. FIG. 9 is a block diagram illustrating the third example of the configuration of the operation management apparatus 100 as the stopping position decision apparatus. In the third example, the operation management apparatus 100 as the stopping position decision apparatus includes the operation schedule database 150, a stopping schedule overlap searching unit 125, the arrival order determination unit 123, and the stopping position decision unit 124.

The stopping schedule overlap searching unit 125 is configured to search the operation schedule database 150 to detect vehicles whose stopping schedules overlap each other. The arrival order determination unit 123 is configured to determine the arrival order at the stopping point for each vehicle between vehicles having overlapping stopping schedules detected by searching the operation schedule database 150. Then, the stopping position decision unit 124 decides the stopping position of each vehicle at the stopping point based on the arrival order determined by the arrival order determination unit 123.

4-2. Processing by Stopping Position Decision Apparatus

Next, processing executed by the stopping position decision apparatus configured as described above will be described with reference to FIG. 10. FIG. 10 is a flowchart illustrating an example of processing executed by the stopping position decision apparatus configured as in the first example.

In step S201, the stopping point/time acquisition unit 121 acquires stopping schedule information of the target vehicle for which the stopping position is to be determined. The stopping schedule information includes a stopping point and a stopping time scheduled for the target vehicle.

In step S202, the operation schedule database 150 is searched by the stopping schedule overlap confirmation unit 122. The search extracts operation schedules of other vehicles that overlap with the stopping schedule of the target vehicle.

Subsequently, in step S203, the stopping schedule overlap confirmation unit 122 confirms the presence or absence of an overlapping vehicle, that is, a vehicle having an operation schedule overlapping with the stopping schedule of the target vehicle. The result of confirmation by the stopping schedule overlap confirmation unit 122 is input to the arrival order determination unit 123.

If it is determined in step S203 that there is an overlapping vehicle, the processing proceeds to step S204. In step S204, the arrival order determination unit 123 calculates the arrival order of the target vehicle and the overlapping vehicle.

Subsequently, in step S205, the stopping positions of the vehicles are decided by the stopping position decision unit 124 based on the arrival order calculated in step S204. If it is determined in step S203 that there is no overlapping vehicle, steps S204 and S205 are skipped.

5. Method for Deciding Stopping Order

The above-described method for deciding the stopping position according to the present embodiment is a method in which a vehicle that arrives at the stopping point earlier is stopped at an offset position from the original stopping position and a stopping place for a vehicle that arrives later is secured. According to the method for deciding the stopping position according to the present embodiment, basically, vehicles are stopped in order from the vehicle that has arrived earlier, and the following vehicles are stopped behind. When all the stoppable places are filled with the stopped vehicles, the next vehicle is stopped at a vacant place formed by a stopped vehicle departing.

However, when the stopping time differs for each vehicle, a vehicle that has stopped earlier does not necessarily depart earlier. That is, there is a possibility that a vehicle coming later departs earlier. In order for a rear vehicle to leave the stopping point earlier than a front vehicle, it is necessary to secure a sufficient inter-vehicle distance in advance. Further, even if there is an inter-vehicle distance for the rear vehicle to go out to the lane, if the inter-vehicle distance is insufficient, the front vehicle forms a blind spot in the camera of the rear vehicle. The stopping order determination method according to the present embodiment is a method for achieving smooth departure of vehicles at the stopping point.

Figure 11A:
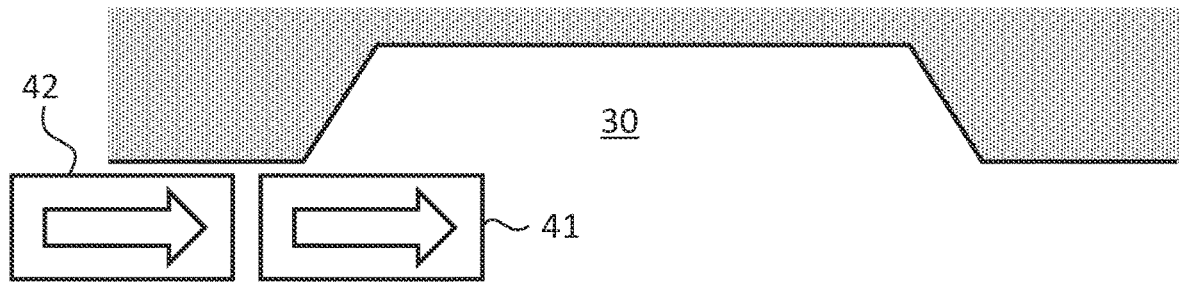
FIG. 11A is a diagram illustrating a method for deciding a stopping order according to the embodiment of the present disclosure.

FIGS. 11A, 11B, 11C, and 11D are diagrams illustrating a method for deciding the stopping order according to the present embodiment. As shown in FIG. 11A, the stopping point 30 is an area having a certain area provided along the road. The original stopping position of the vehicle at the stopping point 30 is a position where the vehicle is most likely to stop and start, for example, the center position of the stopping point 30 (see FIG. 6A). The method for deciding the stopping order is not affected by the service type of the vehicle. That is, the vehicle may be a regular route bus, an on-demand bus, or a taxi.

The method for deciding the stopping order according to the present embodiment is a stopping order decision method in a case where a plurality of vehicles gather at the stopping point 30 in the same time period. When the two vehicles 41 and 42 arrive at the stopping point 30 in succession as shown in FIG. 11A, according to the method for determining the stopping position according to the present embodiment described above, the first arriving vehicle 41 is stopped at a position closer to the front than the original stopping position. However, according to the stopping order decision method according to the present embodiment, the departure times of the two vehicles 41 and 42 are compared with each other. Then, the stopping order is determined such that a vehicle having an earlier departure time is stopped ahead and a vehicle having a later departure time stops behind.

Figure 11B:
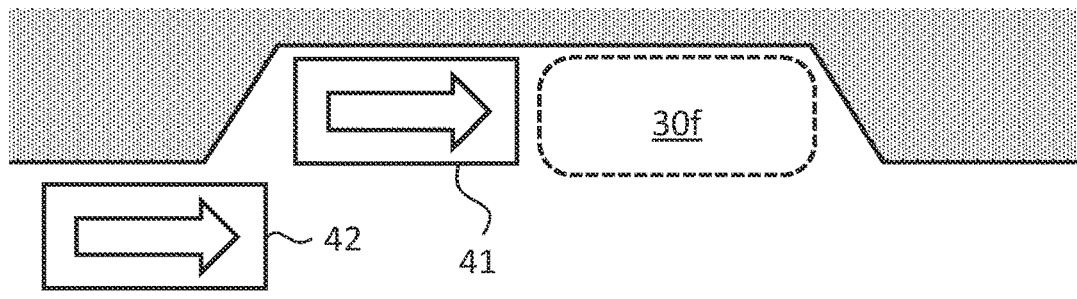
FIG. 11B is a diagram illustrating a method for deciding a stopping order according to the embodiment of the present disclosure.

FIG. 11B shows the stopping order in the case where the departure time of the vehicle 42 arriving later is earlier than the departure time of the vehicle 41 arriving earlier. Since the vehicle 41 arriving earlier stops at the rear side, an empty space 30f is formed in front of the vehicle 41, and a stopping place for the vehicle 42 arriving later is secured. As a result, the vehicle 42 arriving later can stop in front of the vehicle 41 arriving earlier, as shown in FIG. 11C.

The departure time arrives earlier for vehicle 42 than for vehicle 41. No other vehicles are stopped in front of the vehicle 42. Therefore, as shown in FIG. 11D, the vehicle 42 can go out from the stopping point 30 to the lane without being obstructed by other stopped vehicles. In this way, by stopping a vehicle having an earlier departure time ahead of a vehicle having a later departure time, it is possible to suppress disturbance of the traffic flow due to a plurality of vehicles arriving in the same time period.

The stopping order of the vehicles arriving at the stopping point 30 can be determined based on the operation schedule of each vehicle registered in the operation schedule database 150. Specifically, by searching the operation schedule database 150, it is possible to detect vehicles whose stopping times overlap with each other. The stopping order between vehicles whose stopping times overlap with each other can be determined from the departure time included in the operation schedule of each vehicle. When the information registered in the operation schedule is a stopping time defined by a start time and an end time, the end time is used as the departure time. If a single time is registered as the stopping time, the time is used as the arrival time and the stopping time.

Figure 11C:
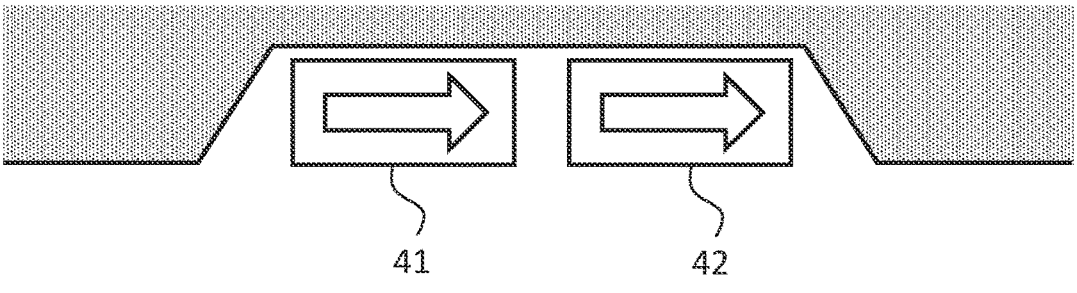
FIG. 11C is a diagram illustrating a method for deciding a stopping order according to the embodiment of the present disclosure.
Figure 11D:
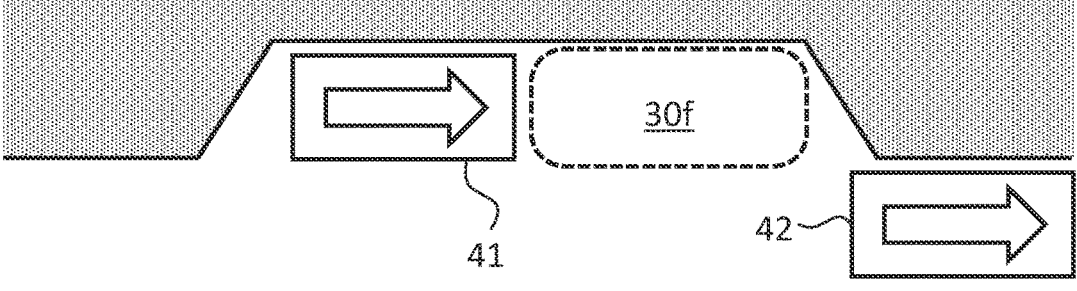
FIG. 11D is a diagram illustrating a method for deciding a stopping order according to the embodiment of the present disclosure.

In FIGS. 11A, 11B, and 11C, the stopping position of the vehicle arriving earlier is offset in the vertical direction for the vehicle arriving later, but the concept of the method for deciding the stopping position described above can be applied to other methods. For example, according to the concept of the method for deciding the stopping position described above, the stopping position of the vehicle that has arrived earlier may be offset in the lateral direction, the stopping direction of the vehicle that has arrived earlier may be rotated, or these may be combined as appropriate.

6. Operation Management Apparatus as Stopping Order Decision Apparatus

6-1. Configuration of Stopping Order Decision Apparatus

6-1-1. First Example

The above-described method for deciding the stopping order is executed by the operation management apparatus

Figure 12:
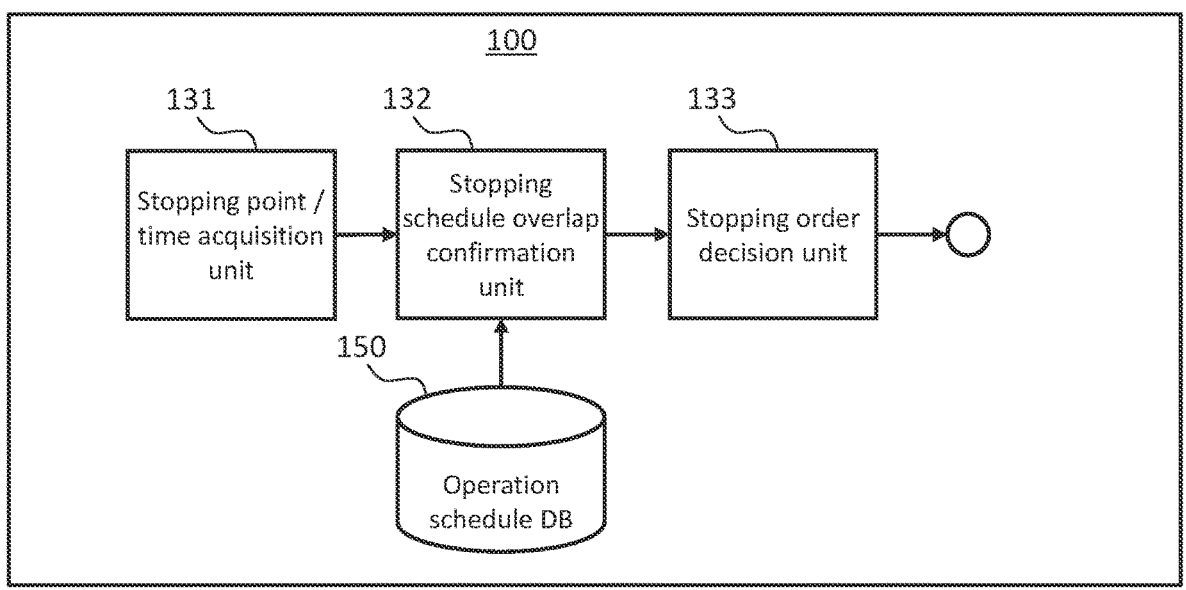
FIG. 12 is a block diagram illustrating a first example of a configuration of a stopping order decision apparatus according to the embodiment of the present disclosure.

100. That is, the operation management apparatus 100 functions as a stopping order decision apparatus that decides the stopping order of a plurality of vehicles that have arrived at the stopping point in the same time period. In other words, the operation management apparatus 100 includes the stopping order decision apparatus as one application. FIG. 12 is a block diagram illustrating the first example of the configuration of the operation management apparatus 100 as the stopping order decision apparatus. In the first example, the operation management apparatus 100 as the stopping order decision apparatus includes the operation schedule database 150, a stopping point/time acquisition unit 131, a stopping schedule overlap confirmation unit 132, and a stopping order decision unit 133.

The information stored in the operation schedule database 150 is as described above. Information on a stopping point and a stopping time is stored in association with vehicle information. The vehicle information is information capable of identifying an individual vehicle. However, in the implementation of the method for deciding the stopping position according to the present embodiment, the information on the service type of each vehicle is not necessarily required.

The stopping point/time acquisition unit 121 is configured to acquire a scheduled stopping point and stopping time when a certain vehicle (target vehicle) is scheduled to stop. The function of the stopping point/time acquisition unit 131 is common to the function of the stopping point/time acquisition unit 121 included in the operation management apparatus 100 as the stopping position decision apparatus.

The stopping schedule overlap confirmation unit 132 is configured to search the operation schedule database 150 for database information overlapping with the stopping schedule information based on the stopping schedule information acquired by the stopping point/time acquisition unit 131. The function of the stopping schedule overlap confirmation unit 132 is common to the function of the stopping schedule overlap confirmation unit 122 included in the operation management apparatus apparatus 100 as the stopping position decision apparatus.

The stopping order decision unit 133 is configured to decide the stopping order of the vehicles at the stopping point between the vehicles whose stopping schedules confirmed by the stopping schedule overlap confirmation unit 132 overlap with each other. The stopping schedule information of each vehicle registered in the operation schedule database 150 is used to determine the stopping order. Based on the departure time included in the stopping schedule information, the stopping order is decided such that a vehicle having an earlier departure time is stopped ahead of a vehicle having a later departure time.

6-1-2. Second Example

In the first example described above, the vehicles are stopped according to the stopping order regardless of the order in which the vehicles arrive at the stopping points. For this reason, there occurs a situation in which a vehicle arriving earlier stops behind the stopping point and a vehicle arriving later stops in front of the vehicle arriving earlier (see FIG. 11B). In this case, the vehicle arriving later (vehicle 42 in FIG. 11B) must repeat forward and backward movements to adjust the stopping position so as not to interfere with the vehicle arriving earlier (vehicle 41 in FIG. 11B).

Figure 13:
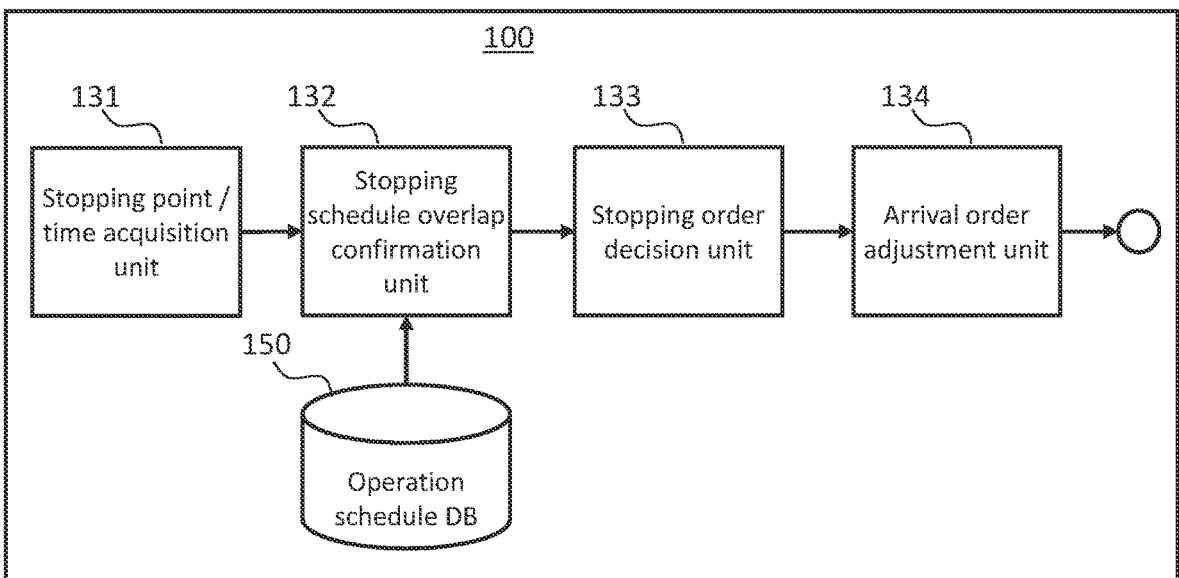
FIG. 13 is a block diagram illustrating a second example of a configuration of the stopping order decision apparatus according to the embodiment of the present disclosure.

If the arrival order of the vehicles is the same as the stopping order, the vehicles can be stopped from the front in the arrival order. When the vehicles are stopped from the front in the arrival order, it is not necessary to adjust the stopping position by repeating forward and backward movements. In the second example, the arrival order of vehicles is made to coincide with the stopping order. FIG. 13 is a block diagram illustrating the second example of the configuration of the operation management apparatus 100 as the stopping order decision apparatus. In the second example, the operation management apparatus 100 as the stopping order decision apparatus includes an operation schedule database 150, the stopping point/time acquisition unit 131, the stopping schedule overlap confirmation unit 132, the stopping order decision unit 133, and an arrival order adjustment unit 134.

The arrival order adjustment unit 134 is configured to adjust the order in which each vehicle arrives at the stopping point so that the order in which the vehicle arrives at the stopping point coincides with the stopping order. The order in which the vehicles arrive at the stopping point can be determined from the arrival time of each vehicle included in the operation schedule information. The arrival order adjustment unit 134 adjusts the arrival order by a method such as adjustment of a vehicle speed, adjustment of a stopping time at a stop on the way, or adjustment of a traveling time by a route change.

6-2. Processing by Stopping Order Decision Apparatus

Figure 14:
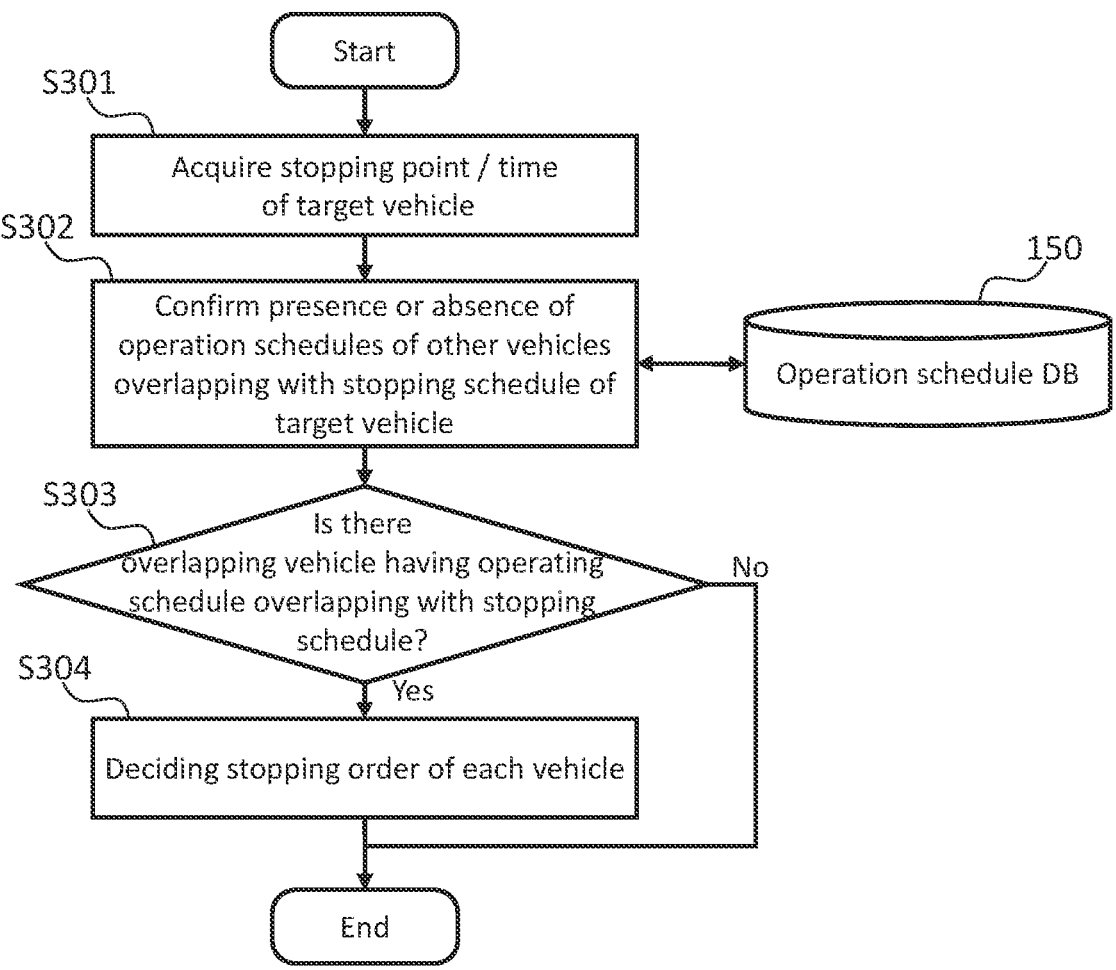
FIG. 14 is a flowchart illustrating an example of processing executed by the stopping order decision apparatus configured as shown in FIG. 12.

Next, processing executed by the stopping order decision apparatus configured as described above will be described with reference to FIG. 14. FIG. 14 is a flowchart illustrating an example of processing executed by the stopping position decision apparatus configured as in the first example.

In step S301, the stopping point/time acquisition unit 131 acquires stopping schedule information of the target vehicle for which the stopping position is to be determined. The stopping schedule information includes a stopping point and a stopping time scheduled for the target vehicle.

In step S302, the operation schedule database 150 is searched by the stopping schedule overlap confirmation unit 132. The search extracts operation schedules of other vehicles that overlap with the stopping schedule of the target vehicle.

Subsequently, in step S303, the stopping schedule overlap confirmation unit 132 confirms the presence or absence of an overlapping vehicle, that is, a vehicle having an operation schedule overlapping with the stopping schedule of the target vehicle. The result of confirmation by the stopping schedule overlap confirmation unit 132 is input to the stopping order decision unit 133.

If it is determined in step S303 that there is an overlapping vehicle, the processing proceeds to step S304. In step S304, the stopping order decision unit 133 calculates the stopping order of the target vehicle and the overlapping vehicle. If it is determined in step S303 that there is no overlapping vehicle, step S304 is skipped.

7. Hardware Configuration of Operation Management Apparatus

Figure 15:
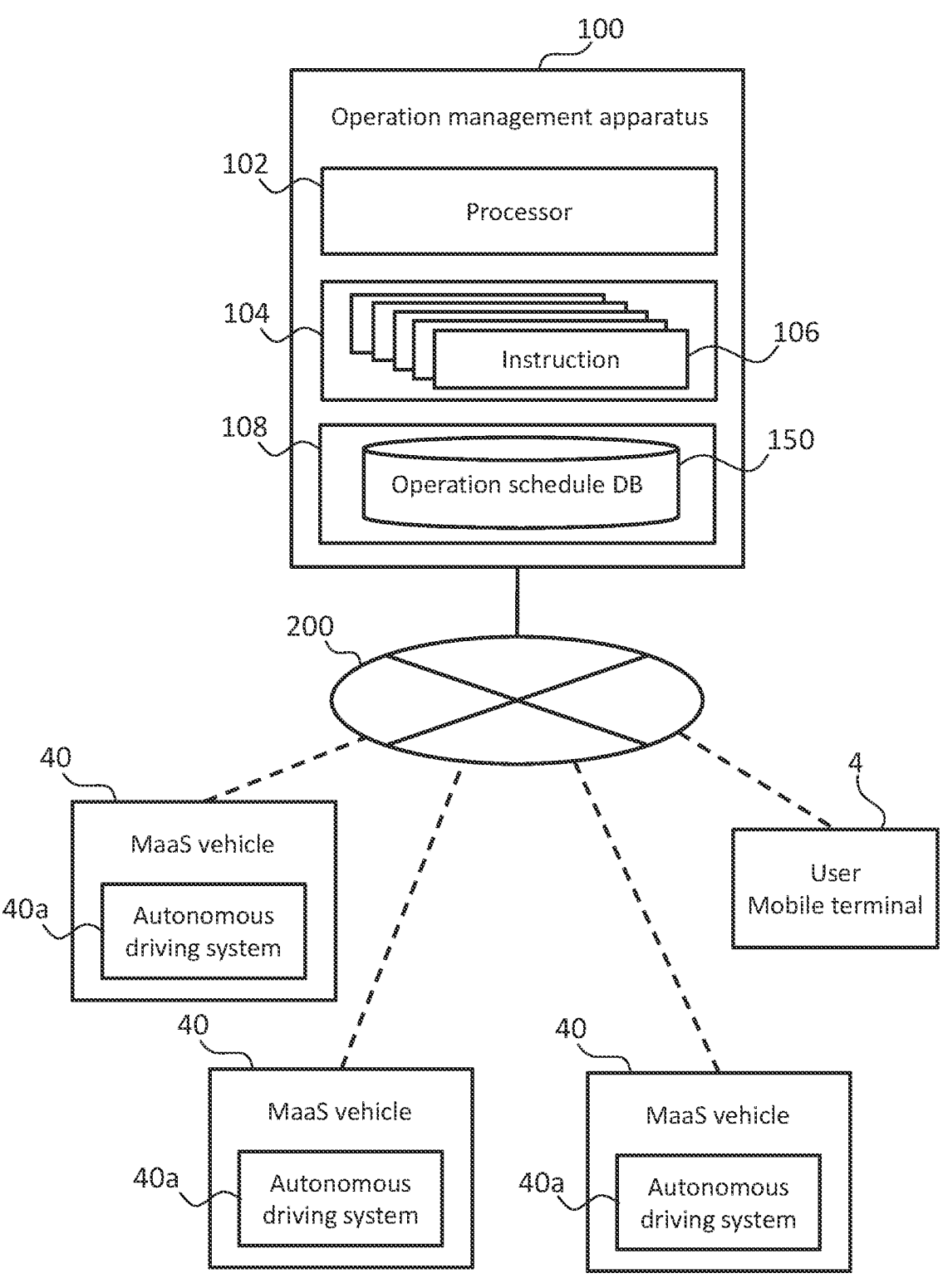
FIG. 15 is a block diagram illustrating an example of a hardware configuration of an operation management apparatus according to the embodiment of the present disclosure.

The functions of the operation management apparatus 100 as the reservation approval/disapproval determination apparatus, the stopping position decision apparatus, and the stopping order decision apparatus described above can be realized by a hardware configuration illustrated in FIG. 15. FIG. 15 is a block diagram illustrating an example of the hardware configuration of the operation management apparatus 100.

The operation management apparatus 100 is, for example, a server connected to the autonomous driving system 40*a* of the vehicle 40 and the mobile terminal 4 of the user via a communication network 200 including a mobile communication system. The operation management apparatus 100 includes at least one processor 102 (hereinafter, simply referred to as a processor 102), a program memory 104, and a data storage device 108. The processor 102 is coupled to the program memory 104 and the data storage device 108. The program memory 104 is a non-transitory memory that stores a plurality of executable instructions 106. The data storage device 108 is, for example, a flash memory, a solid-state drive (SSD), or a hard disk drive (HDD), and the operation schedule database 150 is constructed therein. The plurality of instructions 106 includes instructions to cause the operation management apparatus 100 to function as the reservation approval/disapproval determination apparatus, instructions to cause the operation management apparatus 100 to function as the stopping position decision apparatus, and instructions to cause the operation management apparatus 100 to function as the stopping order decision apparatus.

8. Modification Example of Embodiment

In the above-described method for deciding the stopping order, the stopping order among the vehicles is determined such that a vehicle having an earlier departure time among a vehicle arriving earlier and a vehicle arriving later is positioned ahead of a vehicle having a later departure time. Alternatively, the stopping order of the vehicles may be determined such that a vehicle having a shorter stopping time among a vehicle arriving earlier and a vehicle arriving later is positioned ahead of a vehicle having a longer stopping time. The stopping time can be acquired from the operation schedule information. By preferentially stopping the vehicle having a short stopping time ahead, a smooth departure of vehicles from the stopping point is achieved.

What is claimed is:

1. A method for managing operation of an autonomous transportation service vehicle driven automatically, the method comprising:

receiving at an operation management apparatus an application from a mobile terminal for a reservation for at least one of a point and a time at which a first autonomous transportation service vehicle is to be stopped;

detecting, by the operation management apparatus and using an operation schedule database, an overlap between the reservation and an operation schedule related to a stopping point and a stopping time of each of other autonomous transportation service vehicles operated in a region where the first autonomous transportation service vehicle is operated;

determining, by the operation management apparatus and using a priority decision unit, a priority between the first autonomous transportation service vehicle and a second autonomous transportation service vehicle having an operation schedule overlapping with the reservation among the other autonomous transportation service vehicles, based on at least a service type of each of the first autonomous transportation service vehicle and the second autonomous transportation service vehicle;

notifying, via the mobile terminal, a user of the mobile terminal of approval or disapproval of the reservation determined based on the priority; and when the overlap is detected, stopping one of the first autonomous transportation service vehicle and the second autonomous transportation service vehicle, which is a vehicle arriving earlier, at a position offset from an original stopping position to ensure a stopping place of a vehicle arriving later.

2. The method according to claim 1, wherein determining the priority comprises determining the priority based on a number of occupants in each of the first autonomous transportation service vehicle and the second autonomous transportation service vehicle when there is no difference in service type between each of the first autonomous transportation service vehicle and the second autonomous transportation service vehicle.

3. The method according to claim 1, further comprising changing an operation schedule of the second autonomous transportation service vehicle according to the priority.

4. The method according to claim 1, further comprising proposing a change of the point or the time at which the first autonomous transportation service vehicle is to be stopped in a case of the disapproval of the reservation.

5. The method according to claim 1, further comprising proposing a reservable autonomous transportation service vehicle in a case of the disapproval of the reservation.

6. The method according to claim 1, wherein the stopping the vehicle arriving earlier comprises determining an offset direction of a stopping point of the vehicle arriving earlier such that a vehicle having an earlier departure time among the vehicle arriving earlier and the vehicle arriving later is positioned ahead of a vehicle having a later departure time.

7. The method according to claim 1, wherein the stopping the vehicle arriving earlier comprises determining an offset direction of a stopping point of the vehicle arriving earlier such that a vehicle having a shorter stopping time among the vehicle arriving earlier and the vehicle arriving later is positioned ahead of a vehicle having a longer stopping time.

8. An apparatus for managing operation of an autonomous transportation service vehicle driven automatically, the apparatus comprising:

at least one processor; and a program memory communicatively coupled to the at least one processor, the program memory storing a plurality of instructions configured to cause the at least one processor to:

receive an application from a mobile terminal for a reservation for at least one of a point and a time at which a first autonomous transportation service vehicle is to be stopped;

detect, by using an operation schedule database, an overlap between the reservation and an operation schedule related to a stopping point and a stopping time of each of other autonomous transportation service vehicles operated in a region where the first autonomous transportation service vehicle is operated;

determine, by using a priority decision unit, a priority between the first autonomous transportation service vehicle and a second autonomous transportation service vehicle having an operation schedule overlapping with the reservation among the other autonomous transportation service vehicles, based on at least a service type of each of the first autonomous transportation service vehicle and the second autonomous transportation service vehicle;

notify, via the mobile terminal, the user of approval or disapproval of the reservation determined based on the priority; and when the overlap is detected, stop one of the first autonomous transportation service vehicle and the second autonomous transportation service vehicle, which is a vehicle arriving earlier, at a position offset from an original stopping position to ensure a stopping place of a vehicle arriving later.

9. The apparatus according to claim 8, wherein determining the priority comprises determining the priority based on a number of occupants in each of the first autonomous transportation service vehicle and the second autonomous transportation service vehicle when there is no difference in service type between each of the first autonomous transportation service vehicle and the second autonomous transportation service vehicle.

10. The apparatus according to claim 8, wherein the plurality of instructions is configured to further cause the at least one processor to change an operation schedule of the second autonomous transportation service vehicle according to the priority.

11. The apparatus according to claim 8, wherein the plurality of instructions is configured to further cause the at least one processor to propose a change of the point or the time at which the first autonomous transportation service vehicle is to be stopped in a case of the disapproval of the reservation.

12. The apparatus according to claim 8, wherein the plurality of instructions is configured to further cause the at least one processor to propose a reservable autonomous transportation service vehicle in a case of the disapproval of the reservation.

13. A non-transitory computer-readable storage medium storing a program for managing operation of an autonomous transportation service vehicle driven automatically, the program comprising a plurality of instructions configured to cause at least one processor to:

receive an application from a mobile terminal for a reservation for at least one of a point and a time at which a first autonomous transportation service vehicle is to be stopped;

detect, using an operation schedule database, an overlap between the reservation and an operation schedule related to a stopping point and a stopping time of each of other autonomous transportation service vehicles operated in a region where the first autonomous transportation service vehicle is operated;

determine, using a priority decision unit, a priority between the first autonomous transportation service vehicle and a second autonomous transportation service vehicle having an operation schedule overlapping with the reservation among the other autonomous transportation service vehicles, based on at least a service type of each of the first autonomous transportation service vehicle and the second autonomous transportation service vehicle; and notify, via the mobile terminal, a user of approval or disapproval of the reservation determined based on the priority; and when the overlap is detected, stop one of the first autonomous transportation service vehicle and the second autonomous transportation service vehicle, which is a vehicle arriving earlier, at a position offset from an original stopping position to ensure a stopping place of a vehicle arriving later.

14. The non-transitory computer-readable storage medium according to claim 13, wherein determining the priority comprises determining the priority based on a number of occupants in each of the autonomous first transportation service vehicle and the second autonomous transportation service vehicle when there is no difference in service type between each of the first autonomous transportation service vehicle and the second autonomous transportation service vehicle.

15. The non-transitory computer-readable storage medium according to claim 13, wherein the plurality of instructions is configured to further cause the at least one processor to change an operation schedule of the second autonomous transportation service vehicle according to the priority.

16. The non-transitory computer-readable storage medium according to claim 13, wherein the plurality of instructions is configured to further cause the at least one processor to propose a change of the point or the time at which the first autonomous transportation service vehicle is to be stopped in a case of the disapproval of the reservation.

17. The non-transitory computer-readable storage medium according to claim 13, wherein the plurality of instructions is configured to further cause the at least one processor to propose a reservable autonomous transportation service vehicle in a case of the disapproval of the reservation.

* * * * *